United States Patent [19]

Enke et al.

[11] Patent Number: 4,472,631
[45] Date of Patent: Sep. 18, 1984

[54] COMBINATION OF TIME RESOLUTION AND MASS DISPERSIVE TECHNIQUES IN MASS SPECTROMETRY

[75] Inventors: Christie G. Enke, East Lansing; John F. Holland, Lansing; John T. Stults, East Lansing, all of Mich.

[73] Assignee: Research Corporation, New York, N.Y.

[21] Appl. No.: 385,114

[22] Filed: Jun. 4, 1982

[51] Int. Cl.$^3$ .................................... B01D 59/44
[52] U.S. Cl. .............................. 250/281; 250/287; 250/300
[58] Field of Search ............ 250/281, 282, 283, 296, 250/299, 300, 287

[56] References Cited

U.S. PATENT DOCUMENTS

| | | | |
|---|---|---|---|
| 2,957,985 | 10/1960 | Brubaker | 250/287 |
| 3,563,083 | 2/1971 | Benz | 73/23.1 |
| 3,576,992 | 5/1971 | Moorman et al. | |
| 3,621,240 | 11/1971 | Cohen et al. | 250/287 |
| 3,641,339 | 2/1972 | McCormick | |
| 3,829,689 | 8/1974 | Tsukakoshi et al. | 250/292 |
| 3,863,068 | 1/1975 | Poschenrieder | 250/394 |
| 3,953,732 | 4/1976 | Oron et al. | 250/287 |
| 3,955,084 | 5/1976 | Griffin | 250/299 |
| 4,072,862 | 2/1978 | Mamyrin et al. | 250/286 |
| 4,234,791 | 11/1980 | Enke et al. | 250/281 |
| 4,296,322 | 10/1981 | Wechsung | 250/282 |
| 4,322,629 | 3/1982 | Eloy et al. | 250/299 |

OTHER PUBLICATIONS

Warmack, et al., Int. J. Mass Spection Ion Phys. 27, 239, (1978).
Warmack, et al., J. Chem. Phys. 68, 916, (1978).
Eubank, et al., Rev. Sci. Instrum., 34, 12, (1943).
Wood, et al., Rev. Sci. Instrum., 47, 1471, (1976).
Fenner, et al., Rev. Sci. Instrum., 37, 1068, (1966).
Kilius, et al., Nucl. Instrum. Meth. 191, 27, (1981).
Bykovskii, et al., Sov. Phys.-Tech. Phys. 13, 986, (1969).
Bykovskii, et al., Sov. Phys.-Tech. Phys. 15, 1877, (1971).
Hays, et al., Phys. Rev., 84, 824, (1951).
Enge, et al., Nucl. Instrum. Meth. 97, 449, (1971).
Purser, et al., Nucl. Instrum. Meth. 162, 637, (1979).
F. W. McLafferty, "Tandem Mass Spectrometry (MS/MS): A Promising New Analytical Technique for Specific Component Determination in Complex Mixtures", *Accounts of Chemical Research*, vol. 13, No. 2, Feb. 1980, pp. 33-39.
W. P. Poschenrieder, "Multiple-Focusing Time of Flight Mass Spectrometers—Part I., TOFMS with Equal Momentum Acceleration", *Int. J. Mass Spectrom. Ion Phys.*, 1971, 6, pp. 413-426.
Wiley and McLaren, "Time-of-Flight Mass Spectrometer with Improved Resolution", *Rev. Sci. Instru.*, vol. 26, pp. 1150-1157, (1955).
G. Sanzone, "Energy Resolution of the Conventional Time-of-Flight Mass Spectrometer", *Review of Scientific Instruments*, vol. 41, No. 5, May 1970, pp. 741-742.
R. Stein, "Space and Velocity Focusing in Time-of-Flight Mass Spectrometers", *Int. J. Mass Spectrom. Ion Physics*, vol. 14, pp. 205-218, (1974).

(List continued on next page.)

Primary Examiner—Bruce C. Anderson
Attorney, Agent, or Firm—Scully, Scott, Murphy & Presser

[57] ABSTRACT

Time of flight mass spectrometry techniques are simultaneously combined with path-bending spatial dispersion in magnetic- or electric-sector mass spectrometers to improve the mass resolution or, with an ion fragmentation region, to rapidly obtain multidimensional mass spectral data previously only obtainable by tandem mass spectrometry. The instrumentation generates data defining relationships between parent ions and daughter ions produced by fragmentation, metastable or induced, data to differentiate stable from metastable ions, and data to improve mass resolution. The subject time-resolved mass spectrometers can be combined with chromatography apparatus to obtain multidimensional MS/MS-type data during the relatively short duration of a single chromatographic peak.

52 Claims, 8 Drawing Figures

OTHER PUBLICATIONS

B. A. Mamyrin and D. V. Shmikk, "The Linear Mass Reflection", *Sov. Phys. JETP*, vol. 49, No. 5, May 1979, pp. 762-764, (Eng. transl.), *Zh. Eksp. Teor. Fiz.*, 1979, vol. 76, pp. 1500-1505.

Bykovskii, Yu. A. et al., "Mass-Spectrometer Investigation of Ions Formed by Interaction Between Laser Radiation and Matter", *Sov. Phys.-Tech. Phys.*, 1969, vol. 13, pp. 986-988, (Eng. transl.), *Zh. Tekh. Fiz.*, 1968, vol. 38, pp. 1194-1196.

N. D. Kovalev, D. V. Shmikk, & I. YU Feoktistov, "Time-of-Flight Mass Spectrometer with Magnetic Energy Filter", *Sov. Phys.-Tech. Phys.*, 1978, vol. 23, pp. 718-720, (Eng. transl.), *Zh. Tekh. Fiz.*, 1978, vol. 48, pp. 1282-1285.

J. H. Beynon, R. M. Caprioli, W. E. Baitinger, J. W. Amy, "The Ion Kinetic Energy Spectrum and the Mass Spectrum of Argon", *Int. J. Mass Spectrom. Ion Phys.*, vol. 3, pp. 313-321, (1969).

R. M. Gandy, R. Ampulski, J. Prusaczyk, and R. H. Johnson, "Modification of a Time-of-Flight Mass Spectrometer for Studies in Collisionally Induced Dissociations", *Int. J. Mass Spectrom. Ion Phys.*, vol. 24, No. 4, pp. 363-371, (Aug. 1977).

J. F. Paulson, F. Dale, and S. A. Studniarz, "Study of Ion-Neutral Reactions with a Time-of-Flight Double Mass Spectrometer", *Int. J. Mass Spectrom. Ion Phys.*, vol. 5, No. 1, pp. 113-126, (Oct. 1970).

S. Z. Bokharey, A. E. Holme, J. H. Leck, and W. J. Thatcher, "The Detection of Ions Desorbed from Metal Surfaces", *Vacuum*, vol. 22, No. 11, pp. 599-601, (Nov. 1972).

R. M. Wood, A. K. Edwards, and M. F. Steuer, "Time-of-Flight Energy Spectrometer for Positive Ions", *Rev. Sci. Instrum.*, vol. 47, No. 12, pp. 1471-1474, (Dec. 1976).

L. R. Kilius, E. L. Hallin, K. H. Chang and A. E. Litherland, "An All Electrostatic Mass Spectrometer" *Nuclear Instruments and Methods*, vol. 191, pp. 27-33, (1981).

H. G. Boettger, C. E. Giffin, D. D. Norris, "Electro-Optical Ion Detectors in Mass Spectrometry Simultaneous Monitoring of All Ions Over Wide Mass Ranges", *Multichannel Image Detectors*, Y. Talmi, ed., ACS Symposium Series-102, Washington, D.C., American Chemical Society, 1979, pp. 291-318.

C. E. Giffin, H. G. Boettger, D. D. Norris; "An Electro-Optical Detector for Focal Plane Mass Spectrometers", *Int. J. Mass Spectrom. Ion Phys.*, vol. 15, pp. 437-449, (1974).

J. H. Beynon, D. O. Jones and R. G. Cooks, "Imaging Detector for Mass Spectrometry", *Anal. Chem.*, vol. 47, pp. 1734-1738, (1975).

H. H. Tuithof, A. J. H. Boerboom, H. L. C. Meuzelaar, "Simultaneous Detection of a Mass Spectrum Using a Channeltron Electron Multiplier Array", *Int. J. Mass Spectrom. Ion Phys., vol. 17, 299-307, (1975)*.

K. A. Lincoln, "Data Acquisition Techniques for Exploiting and Uniqueness of the Time-of-Flight Mass Spectrometer: Application to Sampling Pulsed Gas Systems", *Dyn. Mass. Spectrom*, vol. 6, pp. 111-119; (1981) also published as NASA Report TM 81224.

COMBINATION OF TIME RESOLUTION AND MASS DISPERSIVE TECHNIQUES IN MASS SPECTROMETRY

CONTRACT CLAUSE

Support for this invention was received through Michigan State University, National Institutes of Health, and Office of Naval Research.

BACKGROUND OF THE INVENTION

The present invention relates to mass spectrometry apparatus and methods for obtaining multidimensional data which describe relationships between parent ions and daughter ions produced by fragmentation, such as has been previously obtained by tandem mass spectrometers. The invention further relates to multidimensional analysis techniques for improving mass resolution in single-stage mass spectrometers.

In simple mass spectrometers, sample ions are formed such as by electron ionization (EI), passed through a mass analyzer such as a magnetic sector, and detected. The detected ions can be molecular ions, fragment ions of the molecular ion, or fragment ions of other fragments.

Selected ion fragmentation mass spectrometers have recently been developed, characterized by having two sequential stages of mass analysis and an intermediate fragmentation region. Hence, these are generally termed "tandem" or "MS/MS" instruments. In such tandem mass spectrometers, sample ions are produced in an ion source, and the first stage of mass analysis selects parent ions of particular mass. Then, some of the selected parent ions fragment or dissociate, such as by metastable decomposition, collision induced dissociation (CID), or collisionally activated dissociation (CAD), producing daughter ions. Finally, the second stage of mass analysis selects the parent ion and its daughter ions according to mass.

These instruments provide the ability to identify parent ions and the daughter ions which result from fragmentation. The complete MS/MS spectrum is a multidimensional spectrum showing all the daughter ions of each of the parent ions. Subsets of the complete MS/MS data such as a spectrum showing all the daughters of a specific parent ion (daughter spectra) are proving to be invaluable for many applications in complex mixture analysis and structure elucidation. Also proving invaluable are spectra which show all the parents of a particular daughter mass (parent spectra). Useful, too, are spectra which show all parent ions which lose a particular mass during fragmentation, known as neutral loss spectra. MS/MS is an extremely useful technique due to the large amount of characterizing data which may be obtained from a single sample by collecting particular parent ion, daughter ion, or neutral loss spectra, or by collecting the complete MS/MS spectrum.

Heretofore, there have been two general types of tandem mass spectrometers for obtaining MS/MS data. The first of these general types of instruments is a double-focusing or double-sector instrument, a common one being of the Mass-Analyzed Ion Kinetic Energy Spectrometry (MIKES) type. In a MIKES-type instrument, a magnetic momentum selector (magnetic sector) and an electrostatic kinetic energy selector (electric sector) are coupled in tandem, with a fragmentation region between the two sectors. The magnetic sector selects parent ions of particular momentum (related to mass) for fragmentation. The electrostatic sector then produces an ion kinetic energy separation which is interpreted to provide the fragmentation mass spectrum. Such an instrument may be realized with commercially available reversed-geometry double-focusing mass spectrometers.

Both magnetic and electric (electrostatic) sector instruments operate by ion path bending under the influence of the magnetic or electric field, as the case may be. The path radius or, stated alternatively, the deflection angle, is a function of both mass and field strength, as well as of ion velocity. In scanning type magnetic or electrostatic mass spectrometers, ion groups of differing mass are successively swept through a single slit by varying magnetic or electrostatic field strength as a function of time. Thus, in any moment, only a single beam exits the slit, and registers as ion current in an ion detector, typically an electron multiplier.

The second general type of tandem mass spectrometer is known as a Triple Quadrupole Mass Spectrometer (TQMS), so termed because two quadrupole mass analyzers are employed to respectively select parent ions and daughter ions and a third, intermediate, quadrupole operated in the RF-only mode comprises the collision chamber. A triple quadrupole mass spectrometer is disclosed in Enke et al U.S. Pat. No. 4,234,791.

A quadrupole is an electrodynamic focusing device including DC and RF electric fields and which operates as a mass filter. Only ions of selected mass pass through the device, the selected mass being a function of the DC and RF electric fields.

Compared to MIKES, TQMS instruments have a number of significant advantages, including high sensitivity permitting use in trace analysis, rapid scanning speeds permitting relatively high rates of data acquisition when coupled to computer-based control systems, and improved mass resolution for daughter ions over that possible with magnetic and electric sectors as employed in MIKES. The MIKES-type instruments have the advantage of a greater mass range compared to TQMS instruments.

A fundamental disadvantage of tandem mass spectrometers, both of the MIKES-type and the TQMS-type, results from the fact that in operation they are sequential in nature. Only one combination of parent and daughter ion masses is within the ion flight path within the instrument at any one time. To obtain a complete MS/MS fragmentation spectrum showing all possible relationships between parent ions and daughter ions requires that the second mass analyzer (which selects daughter ions) be completely scanned for each potential parent isolated by the first mass analyzer (which selects parent ions). While the quadrupole-based tandem mass spectrometer (TQMS) scans faster than MIKES, the sequential nature of its operation nevertheless limits the rates at which spectral data can be acquired.

Tandem mass spectrometers have been combined with gas chromatographs and liquid chromatographs, resulting in instruments which are respectively termed "GC-MS/MS" and "LC-MS/MS". However, MS/MS heretofore has been too slow to obtain a full multidimensional MS/MS spectrum during the relatively brief period (e.g. one to ten seconds) of a chromatographic peak. Rather, GC-MS/MS is currently implemented for the purpose of selected reaction monitoring (for a particular parent-daughter combination) in which both mass filters are either set at fixed mass numbers, or scan a limited mass range. Ions selected by the first mass filter undergo collision, and selected products of the fragmentation reaction are monitored. Clearly only limited information about the sample is obtained with this technique.

While the foregoing summarizes the two most important instrument types for MS/MS, in the particular context of the present invention there are several other types of mass spectrometers which deserve mention.

As an alternative to magnetic or electric field scanning, spatial array detectors have been proposed which are similar in concept to the traditional use of a strip of photographic film as the output detector of a mass spectrograph, but have the advantage of providing output data in real time as electrical signals. For example, microchannel electron multiplier arrays (MCA) have been proposed, as well as electro-optical ion detectors (EOID) such as is described in Giffin U.S. Pat. No. 3,955,084.

Also deserving mention in the context of the present invention is another form of mass spectrometry known as time-of-flight (TOF) mass spectrometry. TOF mass spectrometry does not rely on path bending as in magnetic or electrostatic spectrometers, nor on electrodynamic filtering of the type which occurs in a quadrupole-type mass filter.

Briefly, in a time-of-flight mass spectrometer ions are produced and then accelerated, either in a constant-energy or a constant-momentum mode.

In either case, lighter (lower mass) ions are accelerated to higher velocities than the heavier ions. The ions then enter a drift region or flight tube which establishes an ion path length, and which is followed by an ion detector. In the drift region, the ions separate along the ion path as a function of their velocity and thus arrive at the detector at different times depending upon their velocities, and therefore, depending upon their mass.

To permit measurement of flight time, ions in a time-of-flight mass spectrometer are bunched, typically by means of a pulsed source, and all ions of a given bunch enter the drift region at substantially the same position and time. By correlating ion pulsing or bunching with arrival time of various ions at the detector, the time-of-flight of each individual ion or group of identical-mass ions can be determined. Ion velocity follows from the simple relationship: (Velocity)=(Path Length)/(Time-Of-Flight). From velocity, ion mass can be calculated, taking into account the characteristics of the ion accelerator.

Time-of-flight mass spectrometry is known to have a number of advantages, including an extremely fast scanning or cycle rate (typically ten thousand mass spectra per second), and potentially unlimited mass range.

Commonly-available commercial time-of-flight instruments measure detected ion current intensities by sampling techniques. Ion current is sampled during only one arrival time for each source pulse. A sampling window or time slice (aperture time) is established, defined by a time delay from the source pulse to the window. The delay time is slowly scanned while the source is repetitively pulsed. A complete mass spectrum of the sample under study is recorded by collecting the ion intensities for each successive arrived time. This technique is known as Time-Slice Detection (TSD).

Also, in order to obtain a statistically valid number of samples, integrating forms of time-slice detectors have been employed, known as "boxcar integrators". The boxcar integrator is triggered for each ion pulse, and integrates ion current during the same aperture time at a constant arrival time for a number of pulses. The aperture time can either be constant or be slowly scanned.

Time-Slice Detection has the disadvantage of losing most of the information available in the ion beam since aperture time is a small fraction of the total time over which ions are arriving at the detector. This creates a potential problem where sample quantities are limited. Accordingly, various devices for Time Array Detection (TAD) have been proposed, known variously as "transient recorders" or "digital transient recorders". Such recorders, rather than responding to a single time slice relative to the pulsed source, collect the entire output from a single source pulse in a time-of-flight mass spectrometer to produce individual data channels (or "time bins") for each of a multiplicity of sample points taken serially in time.

Heretofore available digital transient recorders, although offering an improvement over time-slice detection, are not capable of measuring ten thousand transients per second consistent with the ten thousand per second pulse rate typical in TOF mass spectrometry, and thus lose data as a result of spectra not collected. In particular, their data readout time is in the order of milliseconds, and is inconsistent with the 10 kHz or greater pulse rate of time-of-flight analysis.

Just as a boxcar integrator is an integrating form of time-slice detector, integrating forms of digital transient recorders have been employed, although operating relatively slowly. One name for such devices is Computer of Average Transients, or "CAT". Another form of integrating transient recorder, reported by Linclon, comprises a Biomation Model 8100 digital transient recorder compled to a Nicolet Model 1170 signal averager. See K. A. Linclon, "Data Acquisition Techniques for Exploiting the Uniqueness of the Time-of-Flight Mass Spectrometer: Application to Sampling Pulsed Gas Systems" *Dyn. Mass, Spectrom.*, 6, 111-119 (1981); also published as NASA Report Tm-81224.

An advanced form of integrating transient recorder operating at the required data rate is disclosed in commonly-assigned U.S. patent application Ser. No. 385,115, filed June 1, 1982, concurrently herewith, by Christie George ENKE, Bruce Hewitt NEWCOME and John Francis HOLLAND and entitled "HIGH REPETITION RATE TRANSIENT RECORDER WITH AUTOMAIC INTEGRATION."

Resolution in TOF mass spectrometry would be limited only by detector response speed if all ions started from an initial plane with zero initial energy. This is not the case in reality. There have been a number of efforts to increase resolution in TOF instruments by special focusing techniques. For example, the object of "energy focusing" is to render the produced mass spectrum independent of initial ion kinetic energy. The object of "momentum foucusing" is to render the produced mass spectrum independent of initial ion momentum. More generally, the object of "velocity focusing" is to render the produced mass spectrum independent of initial ion velocity. Similiarly, the object of "space focusing" is to compensate for the initial space distribution. For example, see Wiley and McLaren, *Rev. Sci. Instrum.*, 26, 1150-1157 (1955). Another effort has been the use of V-shaped and linear reflection devices, which also operate on a space focusing principle. For example, see B. A. Mamyrin, V. I. Karataeu, P. V. Shmikk, V. A. Zagulin, Sov. Phys JETP, 37, 45–48 (1973); and B. A. Mamyrin, D. V. Shmikk, Sov. Phys. JETP, 49, 762–764 (1979).

In the particular context of the present invention, it is also pertinent to note that electric sectors for "energy focusing" and magnetic sectors for "momentum focusing" have been proposed for enhancing the revolution of TOF mass analysis. See, for example, Moorman et al U.S. Pat. No. 3,576,992 and Poschenrieder U.S. Pat. No. 3,863,068.

SUMMARY OF THE INVENTION

It is an object of the invention to provide apparatus and methods for more rapidly obtaining data of the type previously obtained by tandem mass spectrometry (MS/MS).

It is a further object of the invention to provide apparatus and methods for rapidly obtaining such data over a relatively large mass range.

It is another object of the invention to provide a single stage mass spectrometer for determining relationships between parent ions and daughter ions produced by fragmentation.

It is yet another object of the invention to provide methods and apparatus for obtaining MS/MS type data sufficiently rapidly to facilitate combination with chromatographic apparatus such that multidimensional data can be obtained during the relatively short duration of a single chromatographic peak.

It is another object of the invention to provide a magnetic sector-based instrument for obtaining MS/MS type data with good mass resolution for both parent and daughter ions.

It is another object of the invention to rapidly obtain and utilize multiple types of data to enhance the resolution of a mass spectrum by combining the data in such a way that mass assignment is independent of either ion momentum or kinetic energy components.

Briefly, and in accordance with an overall concept of the invention, it is recognized that time-of-flight mass spectrometry techniques can be simultaneously combined with simultaneous path-bending spatial dispersion in a simple single-focusing magnetic or electric sector mass spectrometer to rapidly obtain the same type of multidimensional mass spectral information now obtainable by tandem mass spectrometry (MS/MS). Further, either mass spectra free of daughter ions (parent ion spectra free of "metastable peaks") or mass spectra consisting exclusively of daughter ions ("total daughter" spectra) can be obtained. Still further, improved mass resolution over that realized with single-sector mass spectrometers is realized. It is recognized that this multi-dimensional characterization of ions can be accomplished by means of a basic magnetic or electric sector mass spectrometer suitably modified or retrofitted for ion beam pulsing and time-resolved detection, and provided with an ion fragmentation region prior to the magnetic or electric sector, as the case may be.

In a time-of-flight mass spectrometer, ions from a pulsed source are separated in time. In a magnetic sector mass spectrometer, ion flight paths are angularly dispersed in space. In the subject mass spectrometer, ions are simultaneously dispersed in space and separated in time, and the data are collected and interpreted in a manner not heretofore known.

In general, a magnetic sector provides analysis of ion momentum (or an electric sector provides analysis of ion kinetic energy), while time-resolved detection provides analysis of ion velocity. Both have previously been employed in many ways. However, significantly, in accordance with the invention it is recognized that combination of these complementary data can provide all the analytical information gained by currently-available tandem mass spectrometers. Moreover, a mass-to-charge determination independent of either ion momentum or kinetic energy is obtained for both parent and daughter ions. Single-stage mass spectrometry with enhanced resolution is therefore another benefit of the invention.

Of practical significance, time-resolved detection of magnetically-dispersed or electrostatically dispersed ions can be accomplished with commonly-available single-stage instrumentation which is substantially simpler than tandem mass spectrometry (MS/MS) instrumentation, and which provides MS/MS-type spectra at a greater rate. Further, existing single-stage and double focusing magnetic sector mass spectrometers can readily be retrofitted, at relatively low cost compared to the cost of the basic magnetic sector mass spectrometer, to achieve the full benefits of a tandem mass spectrometer.

Briefly, one form of time-resolved magnetic mass spectrometer in accordance with the invention for determining relationships between selected parent ions and daughter ions produced by fragmentation includes a parent ion source which is pulsed so as to permit time-of-flight analysis. (However, in other forms of the apparatus the pulsing to provide ion bunching occurs at later stages, so long as sufficient path length for time-of-flight separation remains prior to detection.) An ion accelerator accelerates the parent ions to velocities as an inverse function of mass. Either constant-energy acceleration or constant-momentum acceleration may be employed. Both constant energy ($\frac{1}{2}$ mv$^2$) and constant momentum (mv) modes of acceleration provide ions having a constant relationship between mass (m) and velocity (v). Following ion acceleration, the parent ions are traveling at a velocity which is an inverse function of their mass, with the result that the total time of travel through the instrument is related to the parent ion mass.

A fragmentation region receives the accelerated parent ions, at least some of which fragment to produce daughter ions. The fragmentation may occur either by collisionally-activated dissociation, or by metastable decomposition, both in the same manner as is conventionally employed in MIKES-type tandem mass spectrometers. It is significant that daughter ions maintain substantially the same velocity as the parent ions producing them.

Following the fragmentation region is a mass analyzer including a deflection field for angularly (by path bending) dispersing the daughter ions and any unfragmented (stable parent) ions as a function of ion mass and velocity and of deflection field strength. In the case of a magnetic sector, the deflection field is a magnetic field (B field).

In turn following the magnetic sector is a detector system responsive to ion intensity and other parameters for determining two individual items of data for ions reaching the detector apparatus: (1) deflection field strength required to produce a particular angular dispersion, and (2) ion time of flight and thus velocity.

In operation, the magnetic field angularly disperses the ions, whether they are unfragmented ions or daughter ions. Thus, as a result of magnetic analysis, in combination with velocity data, the mass of individual daughter ions as well as the mass of parent ions can be determined. Additionally, ions are separated along the ion path as result of their different velocities. However, the velocity of a daughter ion remains essentially the same as that of its parent ion, being altered only slightly by the dissociation process. Accordingly, all daughter ions of the same parent have nearly identical velocities. Significantly, in accordance with the invention it is recognized that the velocity of a particular daughter ion is a reliable indication of the mass of the parent ion from which it fragmented, even though only the daughter ion reaches the detector.

Assuming a single-slit detector is employed and the magnetic field is scanned, for each single value of magnetic field selecting a particular momentum, the ion packet corresponding to unfragmented ions with the selected momentum arrives first at the detector, followed in time by daughter ions with the same momentum but which originated from fragmentations of progressively heavier parents. Output data are in the form of detector current as a function of time. Following acquisition of the detector current as a function of time for each value of magnetic field strength, the complete MS/MS spectrum for the sample can be determined.

Moreover, the mass assignment for any ion, daughter ions as well as parent ions, is completely independent of its kinetic energy. This is an advantage over conventional magnetic or time-of-flight mass spectrometers wherein the normal energy spread of ions from the source adversely affects resolution. This energy spread is due to the initial energy spread of ions before extraction from the source, as well as to slight variations in extraction voltage "seen" by ions originating at different points in the source.

Rather than a magnetic sector which deflects ions in accordance with momentum (the product of mass and velocity), an electrostatic sector which deflects ions as a function of ion kinetic energy (one-half the product of mass times velocity squared) may be employed, with corresponding results, and whereby mass assignment can be made independent of ion momentum.

As an alternative to scanning the deflecting magnetic or electric field strength, the accelerating voltage can be scanned, to obtain similar data.

In accordance with the invention, various specific forms of detector system may be employed so long as ion intensity, ion time-of-flight and the deflection field strength (relative to angular dispersion), for each intensity/time measurement are measured and recorded.

One general type of detector system operates in combination with a single slit at a focal point of the magnetic or electrostatic field analyzer. The single slit defines a fixed angular dispersion which ions must have in order to be detected. In operation, different ion groups (of different momentum or kinetic energy, as the case may be) are successively swept through the single slit by varying or scanning the magnetic or electrostatic deflection field as a function of time. As the magnetic or electrostatic field strength is varied, the trajectories or paths of different ion groups are bent so that their beams successively exit through the slit, with only a single beam exiting the slit at any one time.

Such systems typically employ an electronic ion detector comprising an electron multiplier which provides relatively high sensitivity, producing many orders of magnitude of electrons per ion.

In accordance with the invention, included in the overall detector system and coupled to the output of the ion detector is some form of time-sensitive analyzer. Examples are a time-slice detector or, preferably, a device for time array detection such as a transient recorder or an integrating transient recorder of the types discussed above. Thus, for each individual value of magnetic or electrostatic deflection field strength, complete time-of-flight data are obtained. At the conclusion of a single scan of the magnet, a complete three-dimensional MS/MS spectrum can be deduced of the type previously available only after extensive scanning in an MS/MS type instrument.

In any event, a three-dimensional data field is generated by the subject instrument. The data field can be described as having three axes. One axis is the flight time axis, and may also be viewed as a velocity axis. Another axis is the deflection field strength axis, and may also be viewed as either a momentum axis (for a magnetic sector) or a kinetic energy axis (for an electric sector). The third axis is ion current and is a measure of ion "abundance". A significant aspect of the present invention lies in the capacity for post collection data processing, described hereinafter.

Another general form of detector system employs a spatial array, rather than a single slit detector. A spatial array detector permits ion groups of different momentum (or kinetic energy) to be detected simultaneously following magnetic or electrostatic deflection. Thus no scanning of the deflection magnetic or electrostatic field is required. For this purpose, in accordance with the invention, microchannel array detectors may be employed, either microchannel electron multiplier arrays, or microchannel electro-optical detectors of the type described in Giffen U.S. Pat. No. 3,955,084. To complete the overall detector system, a time-sensitive analyzer, preferably a time array detector, is coupled to each channel of the microchannel spatial array. Thus, complete MS/MS-type data can be obtained for every pulse from the source.

Rather than single magnetic or electric sector instruments, time resolution can be combined with multi-sector instruments, such as either normal or reversed sector double-focusing mass spectrometers. An additional level of information is then obtainable, allowing grandparent/ granddaughter relationships to be determined.

In accordance with the invention, the timeresolved mass spectrometer may be operated in various ways to obtain all of the various types of scans heretofore obtained by MS/MS tandem mass spectrometry, as well as additional useful scan types. The results of these various scan types can be obtained either by operating the subject instruments in a particular way with time-slice detection, summarized next, or by doing a complete scan to collect a complete three-dimensional data field, and subsequently processing the data to reconstruct the spectra of a particular specialized scan.

One type of scan is known as a daughter ion scan, which identifies all daughters of any one parent. For a daughter ion scan, it is recognized that all daughters of any one parent have the same time-of-flight. The detector, such as a time-slice detector, is gated in a manner such that ions of only a single arrival time are detected. The daughter ions are dispersed according to momentum, such as by scanning the magnetic field. The flight time defines the parent ion mass and, in combination with the magnetic field strength required to produce beam deflection at the particular angle defined by the detector slit, defines the daughter ion mass.

Another form of scan is a parent ion scan, which identifies all parent ions which produce a given daughter ion mass. For a parent ion scan, it is recognized that each daughter ion, regardless of its parent, is uniquely defined, in the case of a magnetic sector time-resolved mass spectrometer, by the product Bt, where B is the magnetic field strength which produces a particular deflection and t is the ion time-of-flight. A linked scan of B and t is done, keeping their product constant. In other words, the source is repetitively pulsed and the magnet is scanned, while the time slice of the time detector is continuously adjusted to keep the product Bt constant.

Another useful scan is known as a neutral loss scan, which identifies all parent ions which have lost a specified mass during fragmentation. For a neutral loss scan, a linked scan of magnetic field strength B and flight time t is done, similar in concept to a parent ion scan, but with a more complex functional relationship between B and t, hereinafter specifically described.

Instruments of the present invention can achieve two additional scans in various manners detailed hereinafter. These are stable ion scans and metastable or "total daughter" ion scans. A stable ion scan indicates only stable (parent) ions, while screening out any ions which result from fragmentation processes. Such a scan is particularly useful because a true stable ion spectrum is obtained free of "metastable peaks" which may be undesired in some analyses. A metastable or fragment ion scan results in a spectrum of daughter ions, without any stable ions, and has potential use as a "fingerprint" of a compound. This scan may also be termed a "total daughter" ion scan.

While the various scans are summarized above in the context of a time-resolved magnetic-sector mass spectrometer, it should be noted that corresponding scans exist in the case of time-resolved electric-sector mass spectrometers. Also, the scans summarized above may all be produced by scanning the accelerating voltage of a constant-energy acceleration ion source, or by scanning the acceleration pulse voltage or pulse duration in a constantmomentum acceleration ion source. All the scans summarized above are described hereinafter in detail under the headings "Mass Assignment in Time-Resolved Mass Spectrometry" and "Summary of Mass Assignment and Scanning Methods".

Daughter ion scans, parent ion scans and neutral loss scans have proven to be useful in tandem (MS/MS) instruments, and may readily be obtained in instruments of the subject invention with time-slice detection. It should nevertheless be noted that such scans are limited scans which evolved in view of the data rate limitations of prior MS/MS instruments. When a Time Array Detector such as a transient recorder is employed in the practice of the subject invention, it is significant that data accumulated during a single scan of the magnetic or electric sector are sufficient for a computer to subsequently determine all parent-daughter relationships.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENTS

Figure 1:
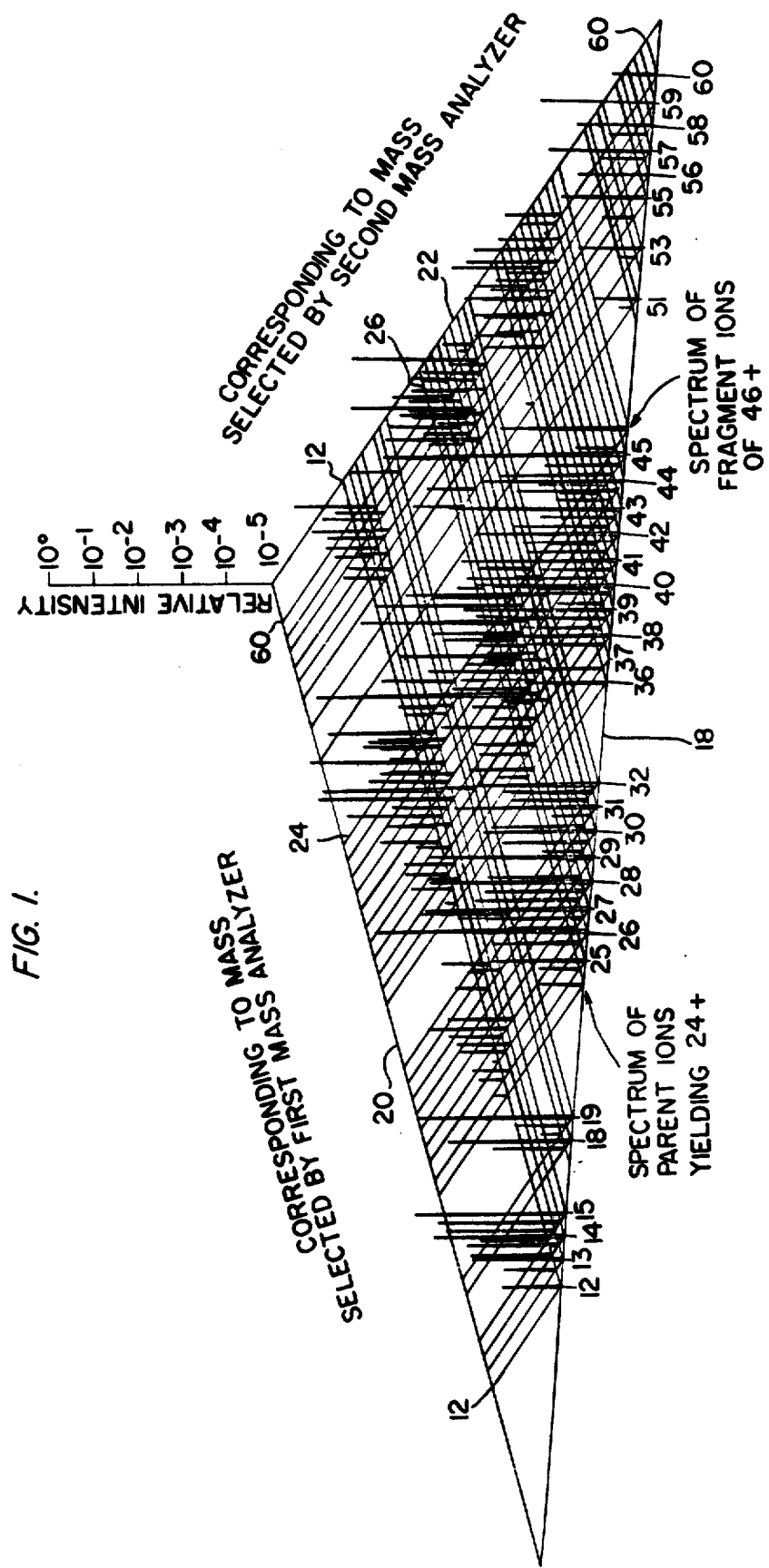
FIG. 1 is a three-dimensional graphical depiction of the fragmentation (MS/MS) spectrum of pure isopropanol.

Referring at the outset to FIG. 1, a three-dimensional fragmentation spectrum of pure isopropanol is shown, graphically illustrating the multi-dimensional information previously obtainable through extensive scanning in a tandem mass spectrometry (MS/MS) instrument, and now obtainable much more rapidly by timeresolved mass spectrometers in accordance with the present invention. To facilitate comparison with previous MS/MS instruments, the plot of FIG. 1 is also labeled to indicate how this same information is obtained in prior MS/MS instruments. FIG. 1 may be viewed as a complete MS/MS three-dimensional data array depicting ion intensity as a function of mass. Parent ion, daughter ion and neutral loss scans are useful scans which result in less than the complete data array, and may be visualized as different slices through the complete FIG. 1 data array as described below.

In FIG. 1 a row of peaks along a diagonal line 18 of equal first and second analyzer mass represents the normal electron impact ionization (EI) spectrum of isopropanol, i.e., the spectrum which results from single-stage mass spectrometry (MS). In prior tandem (sequential) mass spectrometers (MS/MS), scanning along the horizontal axis 20 is accomplished by means of the first mass analyzer, which precedes the fragmentation region. The vertical axis 22 represents various daughter ion spectra, and corresponds to the mass selected by the second mass analyzer (following the fragmentation region) in a tandem mass spectrometer.

While FIG. 1 depicts the entirety of information available for a single compound or a single mixture obtainable by tandem mass spectrometry, as well as by time-resolved spectrometry in accordance with the present invention, various specialized scans for obtaining less than all of the available information have also been shown to be quite useful. The specialized scans have evolved in the context of MS/MS-type instruments, particularly where limited quantities of unknown sample are available, due to the time required to scan both mass analyzers through their entire mass range in all possible combinations. Two of these scan types may be seen with reference to FIG. 1.

Specifically, the daughter ion spectra of each of the ions in the normal spectrum are shown on the lines running diagonally from upper left to lower right parallel to the vertical axis 22. Such spectra are the result of a daughter ion scan (constant parent ion scan). For example, the exemplary line 24 depicts mass peaks comprising a spectrum of daughter ions fragmented from a parent ion of mass number 46. In prior MS/MS instruments, this is achieved by setting the first mass analyzer to pass the parent mass, and scanning the second mass analyzer.

Parent ion spectra, i.e., spectra of ions whose fragmentation resulted in the formation of a certain daughter ion, are shown on the lines running diagonally from lower left to upper right, parallel to the horizontal axis 20. Such spectra are the result of a parent ion scan (constant daughter ion scan). For example, the line 26 depicts the mass peaks of all parent ions which, as a result of fragmentation, yielded a daughter ion of mass 24. In prior MS/MS instruments, this is achieved by scanning the first mass analyzer with the second mass analyzer set for the desired daughter mass.

Not specifically depicted are neutral loss spectra, which would show all parent ions which differ from one of their daughter ions by a specific mass. A neutral loss spectrum would be depicted on a line parallel to the line 18 with parent spectra, but displaced rearwardly by a distance corresponding to the amount of the neutral loss. In prior MS/MS instruments, a neutral loss scan is achieved by scanning both mass analyzers together, but at a difference in mass equal to the selected neutral loss.

As is known, the multi-dimensional information as is depicted in FIG. 1 is especially valuable for the determination of organic structures and the direct analysis of mixtures. The daughter ions formed through decomposition of a parent ion are characteristic of specific functional groups, specific classes of compounds, or of specific compounds. Metastable or collision-induced dissociations have also proven extremely useful in determining ion fragmentation pathways, and determining unknown molecular structures.

Figure 2:
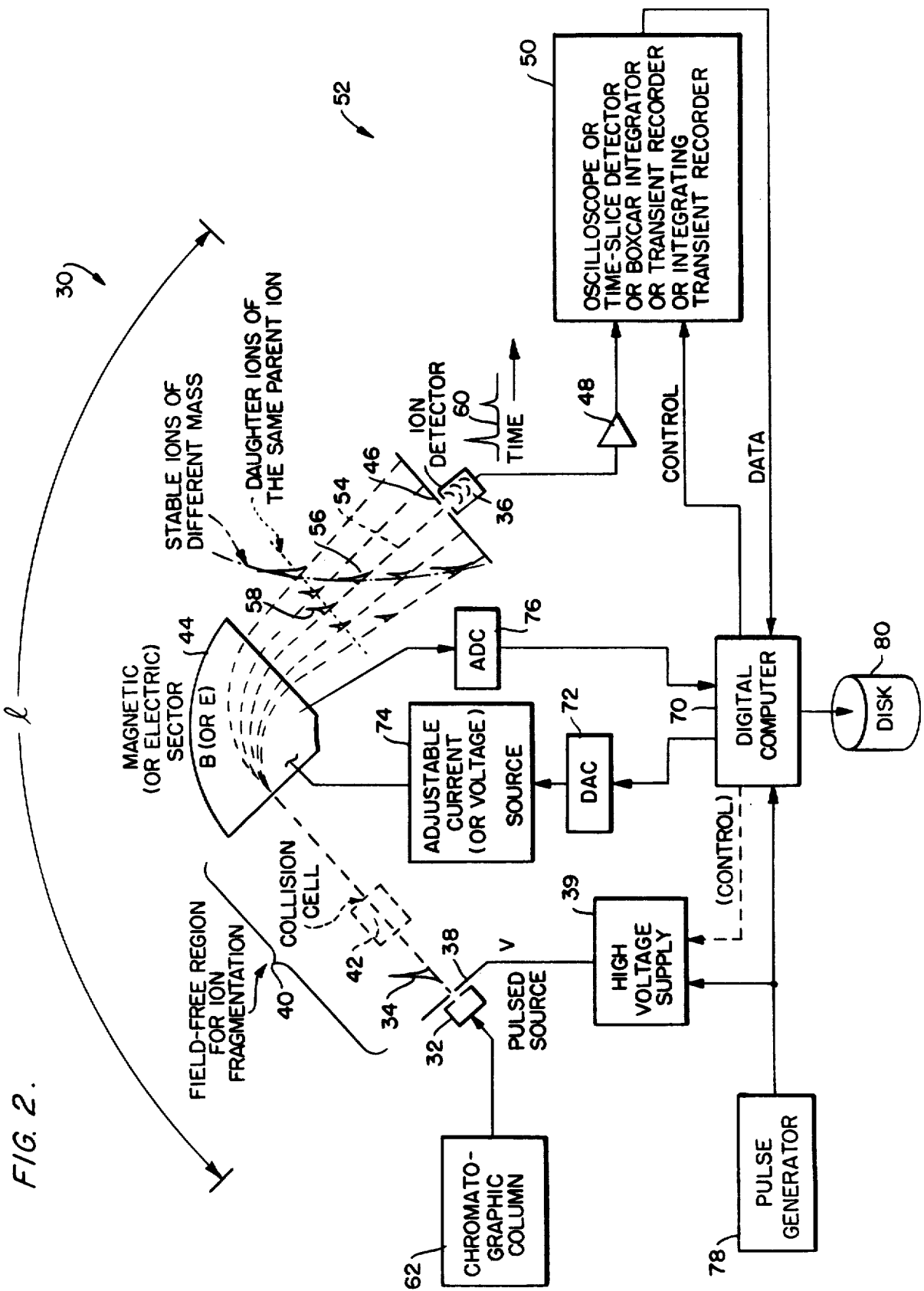
FIG. 2 is a block diagram of a time-resolved magnetic (or electric) sector mass spectrometer combined with a chromatographic column in accordance with the invention.

With reference now to FIG. 2, a time-resolved magnetic (or electric) sector mass spectrometer 30 in accordance with the present invention is depicted, together with a representation of its mode of operation. For convenience, a number of variations are noted in parenthesis in FIG. 2, and described hereinafter.

The FIG. 2 time-resolved magnetic (or electric) sector mass spectrometer 30 is shown in highly schematic form. However, as will be appreciated by those skilled in the art, its essential elements comprise well-known commercially available devices, and as such need not be described in detail herein. The FIG. 2 instrument 30 may be viewed as a simple single-focusing magnetic mass spectrometer modified with different input and output elements. One of the advantages of the subject invention is the ease with which it may be implemented, and modification of existing single-focusing magnetic mass spectrometers is a relatively low-cost and straightforward approach.

Considering the FIG. 2 time-resolved magnetic (or electric) sector mass spectrometer 30 in greater detail, parent ions are provided by an ion source 32, such as by Electron Ionization (EI), Chemical Ionization (CI), Fast Atom Bombardment (FAB), Field Desorption (FD), Laser Desorption (LD), Thermal Desorption (TD), Field Ionization (FI), Cf-252 Plasma Desorption (PD), Atmospheric Pressure Ionization (API), or any other suitable means of ionization.

For purposes of time-of-flight analysis, ions must be pulsed or bunched at some point in the instrument 30 upstream of at least a drift region for ion separation included in the mass spectrometer 30. In FIG. 2, the ion bunching device comprises the ion source 32 itself which, accordingly, is a pulsed ion source and provides repeated ion pulses, a single ion pulse or packet being represented at 34. The drift region for ion separation then comprises the entire ion path of length 1 through the mass spectrometer 30, up to an ion detector 36.

The specific pulsing technique employed can be of considerable significance where high sensitivity is an important objective. In one form, ions are continuously accelerated from the source by acceleration electrodes 38 (a process also known as extraction), which electrodes 38 may be viewed as an ion accelerator. The electrodes 38 are supplied with acceleration voltage V from a high voltage supply 39. A set of beam deflection plates, (not shown) has a square wave pulse applied to sweep the ion beam past an entrance aperture, and thus effectively provides a short ion pulse. This process of continous ionization and ion extraction followed by beam deflection, while relatively easy to implement, is essentially a beam chopping process and discards all ions which are not part of the pulse. Signal strength, which is related to duty cycle, is therefore quite low. Specifically, good resolution in time-of-flight analysis requires a narrow pulse width in the order of 10 nanoseconds, but a cycle duration in the order of 25 microseconds is required. Thus, only (10 nanoseconds)/(25 microseconds) = 0.004 of the ions extracted are utilized.

One preferred pulsing mechanism is one used in conventional time-of-flight instruments. Ions are generated for a period of time, after which an extraction pulse forms the ion packet. The ions formed are held by the space charge of the ionizing electron beam until the extraction takes place. In this way, ions are "stored" prior to the formation of the pulse. For small samples, ion storage can provide a significant increase in signal strength.

Another preferred pulsing mechanism is one in which the sample is a solid or is embedded in a non-volatile matrix. Ions are formed only during very brief pulses of ionizing energy. Sample molecules which are not ionized during that pulse remain intact for subsequent ionization pulses. Thus no sample is lost. For example, a pulsed laser focused on a solid sample in the ion source has been used to ionize and desorb molecules from the sample surface. (R. J. Conzemius, J. M. Capellan, *Int J. Mass Spectrom. Ion Phys.*, 34, 197–271 (1980)). Similar results can be achieved with a repetitive spark discharge. Sample that is not ionized and desorbed during any one pulse of the laser remains available for subsequent laser pulses and is thus is not lost between pulses. After the laser pulse the ion packet can be extracted from the source by an extracting acceleration pulse. If the ions are formed in a sufficiently short period, the acceleration potential can be left on continuously and the ionization process becomes the pulse forming step.

Two general classes of ion acceleration are known. In the constant-energy acceleration mode, all ions are allowed to pass through the entire accelerating field. In the constant-momentum acceleration mode, the accelerating field is turned off before any ions traverse the entire accelerating electric field gradient. Either may be employed in the practice of the invention.

A typical value of accelerating voltage is 3.5 kV. With an ion path or flight length 1 of 1.0 meter, all ions from one pulse of the source 32, ranging from 1 to 1000 mass units, reach the detector 36 within 40 microseconds. The ion pulses are repeated at a rate in the order of 10 to 25 kHz.

The ion pulse or packet 34 next enters a fragmentation region 40 having conditions which facilitate decomposition and wherein at least some accelerated ions fragment to produce daughter ions. Operation of the present invention depends upon fragmentation occurring without any substantial change in velocity. In other words, individual daughter ions maintain approximately the same velocity as the particular parent ions producing them. An important aspect of the present invention is the measurement of daughter ion velocity to determine the mass of the parent ion which produced the daughter ion, even though only the daughter ion reaches the ion detector, and the combination of the information with deflection field strength date to determine parent/daughter relationships.

As is known, the fragmentation region 40 may comprise a field-free region, where metastable ions dissociate spontaneously. Various means may be employed to facilitate unimolecular decomposition, such as photodissociation, electron excitation, and others. Alternatively, the fragmentation region 40 may comprise a collision cell 42, which is shown in dash lines in FIG. 2 to indicate that the collision cell 42 is an alternative. To minimize loss of mass resolution for daughter ions, it is desireable to place the fragmentation cell or region close to the acceleration region. The fragmentation region 42, whether it is for metastable dissociation or collisionally-activated dissociation, is of the same type previously employed in MIKES-type tandem mass spectrometers, as the energy levels and fragmentation mechanisms are substantially identical.

Following the field-free region 40, parent and daughter ions enter a mass analyzer 44 including a field for angularly dispersing (by path bending on a particular radius) all the ions as a function of ion mass and velocity and of field strength. The mass analyzer 44 is depicted as a magnetic sector 44 including a magnetic deflection field (B field) wherein the ions follow various flight paths of differing curvatures or radii as a function of their momentum (product of ion mass times velocity). Alternatively, the mass analyzer 44 may comprise an electric sector including an electrostatic deflection field (E field), in which case various ion paths defined by differing radii occur as a function of ion kinetic energy (one-half the mass times velocity squared). Suitable mean is included to enable deflection field strength to be determined.

Thus, ions are separated into differing curved paths as a function of their momentum (assuming a magnetic sector mass analyzer 44) and, at the same time, in accordance with time-of-flight principles, are separated along the ion path as a function of their different velocities. Again, as mentioned above, the velocity of a daughter ion remains essentially the same as that of its parent ion, altered only slightly by the dissociation process, so all daughter ions of the same parent have nearly identical velocities.

To complete the basic structure of the time-resolved mass spectrometer 30, a single exit slit 46 follows the magnetic sector 44 to allow only ions following a particular path to enter the ion detector 36.

The ion detector 36 itself may comprise any suitable type, and typically is an electron multiplier. A current-to-voltage converter 48 is connected to the output of the detector 36, in turn connected to a time-resolving device generally designated 50. As indicated, various alternative forms of time-resolving devices 50 can be employed in the practice of the invention. Five alternative forms specifically indicated for purposes of example are an oscilloscope (for manual data collection), a time-slice detector (TSD), a boxcar integrator (integrating time-slice detector), and two devices for time-array detection (TAD): a transient recorder and an integrating transient recorder (ITR).

Thus, the ion detector 36, the slit 46 and the time-resolving device 50, and the connections enabling deflection field strength to be determined together comprise an overall detector system, generally designated 52. The detector system 52 is responsive to the ion intensity output of the mass analyzer 44, the deflection field strength required to produce a particular angular dispersion (spatial dispersion), and is coupled to the pulsed source 32 (through timing connections hereinafter described) for determining ion time-of-flight (time separation) and thus velocity. Time-of-flight by itself indicates parent ion mass of a detected daughter ion and, in combination with deflection field strength required to produce a particular angular dispersion, indicates the masses of all ions, daughter ions and unfragmented parent ions.

Generally, in operation, the source 32 is repetitively pulsed while the magnetic field strength B within the magnetic sector 44 is scanned or varied as a function of time, thus sweeping various ion groups past the detector slit 46. A corresponding result is realized in the case of an electric sector by scanning electric field strength E.

Alternatively, the overall detector system 52 may comprise a spatial array detector, described hereinafter with reference to FIG. 7. In such event, the magnetic field strength is not scanned.

Still with reference to FIG. 2, for a single value of the magnetic field strength B, for example that which results in ions along the exemplary ion path 54 reaching the detector slit 46, representative ion packet 56 corresponding to stable ions with the selected momentum arrive first at the ion detector 36, followed in time by daughter ions, such as represented by the ion pulse 58, with the same momentum which originated from fragmentations of progressively heavier parent ions. Thus, representative plot 60 of detector current as a function of time shows two corresponding current peaks. After collection of the detector current versus time curves for each value of magnetic field strength, the complete MS/MS spectra for the sample can be determined.

As is mathematically demonstrated hereinafter, the mass assignment for any ion (daughter or parent ion) is based solely on the combination of the magnetic field strength required to produce a particular deflection and time-of-flight, and is completely independent of its kinetic energy. Daughter ion, parent ion, and neutral loss spectra can be obtained by scanning the magnetic field strength and recording ion intensity at particular arrival times.

Two scanning alternatives have been described thus far with reference to FIG. 2. Specifically, scanning magnetic field strength B in the case of the mass analyzer 44 comprising a magnetic sector, and scanning deflection electrostatic field strength E in the case of the mass analyzer 44 comprising an electric sector. A third alternative is to scan the acceleration voltage V produced by the high voltage supply 39 and supplied to the acceleration electrodes 38. Comparable results are achieved, as is described hereinafter with reference to mathematical analysis. If acceleration voltage V is scanned, magnetic field strength B need not be, thus permitting the use of a permanent magnet for the magnetic sector. This is of potential value particularly in a portable instrument.

Advantageously, the subject time-resolved magnetic (or electric) sector mass spectrometry technique achieves data acquisition rates sufficiently fast to permit combinations with gas and liquid chromatographic apparatus where complete MS/MS type data can be acquired during a single chromatographic peak. This is in contrast to previous GC-MS/MS and LC-MS/MS combinations which have been restricted to selected reaction monitoring (for a particular parent-daughter combination) and very limited scanning of parent or daughter ions. Accordingly, also shown in FIG. 2 is a chromatographic column 62 connected to supply samples to the pulsed source 32. In operation, carrier-borne sample components from the chromatographic column 62 enter the ion source 32 where they are subjected to ionizing conditions. The resulting ions are extracted and accelerated in the manner described hereinabove.

The entire time-resolved magnetic (or electric) sector mass spectrometer 30 of FIG. 2 preferably operates under a digital computer control and data acquisition system comprising a computer 70 operating under stored program control, in a manner well known in the art. As is known, a digital computer such as the computer 70 has a number of input and output ports which are connected to receive data from and to supply commands to external devices. Various types of signal conditioning are required in view of the digital nature of the signals processed by the computer and the analog nature of many external devices, as well as the different signal or voltage levels normally involved. Accordingly, computer output signals are processed by digital-to-analog converters, such as representative converter 72 connected to an adjustable current source 74 which supplies the electromagnet (not shown) within the magnetic sector 44. Alternatively, in the case of an electric sector, element 74 is an adjustable voltage source. Computer input signals are processed by analog-to-digital converters such as the representative analog-to-digital converter 76 connected to sense magnetic field strength (B) within the magnetic sector 44 by means of a Hall effect detector (not shown), and to supply a digital signal indicative of magnetic deflection field strength to the computer 70, and thereby to the detector system 52. Alternatively, electric field strength E may be determined, either by command or by measurement, and the information supplied to the detector system 52. As is known, such a digital computer 70 can control processes and analyze data in real time, and make calculations necessary to generate magnetic field scans (B scans), electric field scans (E scans), acceleration voltage scans (V scans) and time-slice scans, all described hereinafter with reference to mathematical analysis.

The computer 70 also serves as a link between a pulse generator or clock 78 which controls the repetition rate (e.g. 10 kHz) of the time-of-flight pulsed source 32 and the time-resolved detector 50. The computer 70 receives output data from the time-resolved detector 50. For storage of large amounts of data, a mass storage unit such as a hard disk unit 80 receives data from the computer 70.

Moreover, as summarized above, a three-dimensional data field may readily be generated by the instrument 30 for each increment in chromatographic retention time, and stored in the disk unit 80 for post-collection processing. The data field has a flight time t axis, and a deflection field strength (B or E) axis, and an ion intensity axis. The manner in which post-collection data processing may be accomplished is described hereinbelow following the mathematical analysis presented under the heading "Mass Assignment in Time-Resolved Mass Spectrometry."

It will be appreciated that the time-resolved mass spectrometer 30 specifically shown in FIG. 2 is a relatively comprehensive one, and various simplifications and modifications may be made to suit the requirements of individual analyses. For example, for a relatively simple implementation, an LKB9000 single-focusing magnetic sector GC-MS can be readily modified. In such modification, sample molecules are ionized and accelerated out of the source as is done normally. A set of deflection plates for beam focusing is included in the basic LKB9000 and is located immediately following the entrance slits of the mass spectrometer portion of the device, upstream of the flight tube. These deflection plates normally have a high voltage applied and, in the modification, a 50 volt peak-to-peak square wave signal is AC-coupled and superimposed on the deflection plate voltage. Each pulse of the square wave signal applied to these deflection plates allows a narrow (in time) packet of ions to enter the flight tube, thence through the magnet, and to the detector. In a very simple implementation, the vertical channel of an oscilloscope is connected to the ion detector output, and the horizontal trace of the oscilloscope is connected so as to be triggered by the same pulse generator which pulses the deflection plates.

In operation, the magnetic field strength is scanned slowly while the source is repetitively pulsed. As is described hereinabove, for each single value of the magnetic field strength, the oscilloscope trace indicates the arrival first of the ion packet corresponding to parent ions with the selected momentum, followed in time by daughter ions with the same momentum which originated from fragmentations of progressively heavier parents. By varying the magnetic field strength and collecting the detector current-time curves for each value of magnetic field strength, information sufficient to determine the complete set of MS/MS spectra for the sample can be obtained.

Mass Assignment in Time-Resolved Mass Spectrometry

Presented now is a mathematical demonstration from basic mass spectrometry principles of the manner in which mass spectral information previously obtainable by tandem mass spectrometry (MS/MS) is acquired through time-resolved detection of magnetically-dispersed ions or electrostatically-dispersed ions in accordance with the present invention. For clarity, the case of a magnetic sector (B field) instrument is described first, followed by the case of an electrostatic sector (E field) instrument.

For a mass spectrometer in which ions are accelerated out of the source with the same kinetic energy, ion velocity is given by the following equation:

$$0.5 \, mv^2 = zeV \quad (1)$$

where
m is ion mass,
v is ion velocity,
z is the number of electronic charges on the ion,
e is electronic charge, and
V is accelerating voltage.

Either by pulsing the accelerating voltage or deflecting the ion beam, both in the manner described above, a pulse of nearly mono-energetic ions is produced. After acceleration, the velocity v of any ion is inversely proportional to the square root of its mass m, as may be seen from Equation (1) above. As the accelerated ions travel through space along the ion path length l, they separate according to mass, the lightest ions traveling the fastest.

The following simple relationship specifies the time-of-flight t of ions reaching a detector 36 of fixed distance, l from the pulsed ion source:

$$T = l/v \quad (2)$$

where
l is ion path length, and
t is ion time-of-flight.

Solving Equation (2) for v and substituting into Equation (1) results in the following equation, which gives the relationship between mass (and charge) of the ion and time-of-flight for the case of constant-energy ion acceleration:

$$m/z = 2Vet^2/l^2 \quad (3)$$

For a mass spectrometer in which ions are accelerated out of the source with the same momentum, ion velocity is given by the following equation:

$$mv = zeE_pT \quad (1')$$

where T is the duration of an accelerating pulse of magnitude $E_p$. In this case, the accelerating field (magnitude $E_p$) is turned off before any ions traverse the entire field gradient.

Substituting v from Equation (2) into Equation (1') results in the following equation, which gives the relationship between mass (and charge) of the ion and time-of-flight for the case of constant-momentum ion acceleration:

$$m/z = E_pTet/l \quad (4)$$

Equation (4) for constant-momentum acceleration thus corresponds to Equation (3) for constant-energy acceleration.

In the following analysis, the case of constant energy acceleration mode specified by Equation (3) is analyzed in detail, particularly for the magnetic sector case. To avoid undue repetition, generally the results only for the various other cases are presented, which may readily be derived in the same manner from the equations presented above.

In a magnetic mass spectrometer, ions are dispersed in accordance with their momenta, with the following specific relationship:

$$mv = Bzer \quad (5)$$

where

B is the magnetic field strength, and
r is the radius of the ion's circular path in the magnetic field.

In accordance with the invention, the flight time of an ion (inversely proportional to velocity, v) and the magnetic field required to pass that ion (proportional to momentum, mv) results in the direct determination of ion mass-to-charge ratio, independent of ion kinetic energy, ½ mv².

These conclusions are expressed by the following equation, which is derived in accordance with the invention by solving Equation (2) for v and substituting into Equation (5):

$$\frac{m}{z} = Bt\left(\frac{er}{l}\right) \quad (6)$$

There are two significant conclusions to be drawn. First, for a given mass, the product of B and t is a constant. Thus, the measurement of B and t allows the determination of mass independent of ion kinetic energy.

Second, mass assignment in accordance with Equation (6) is accurate for all ions which do not change in mass within the magnetic sector and which have a velocity in the magnetic sector substantially equal to their average velocity v=l/t. Thus, any mass changes, particularly changes as a result of fragmentation, which occur between the ion source and the entrance to the magnetic sector (i.e., in the fragmentation region 40) do not affect the mass determination. The effects of ion velocity changes due to fragmentation can be made negligible by locating the fragmentation cell early in the flight path. This ability to determine mass independent of the energy changes often attending the fragmentation process is exploited in accordance with the present invention to perform analysis normally requiring a tandem (MS/MS) mass spectrometer.

In particular, the daughter ion of a parent which undergoes fragmentation (either by metastable decomposition or collisionally-activated dissociation) in the field-free region 40 preceding the magnetic sector follows a path having the correct radius of curvature to be transmitted to the detector at a magnetic field strength corresponding to the ion momentum, and can be accurately assigned a mass from Equation (6), assuming ion velocity through the magnetic sector is substantially equal to the average velocity over the entire flight path.

The velocity of any given daughter ion is nearly identical to the velocity of the parent ion which produced the daughter ion, since the release of kinetic energy in the fragmentation process alters the velocity only slightly. The effect of this velocity change on the average velocity is minimized by placing the fragmentation region very early in the flight path. Significantly, in accordance with the invention, it is recognized that measurement of the flight time of the daughter ion gives the velocity of both parent and its daughter. From Equation (3) above, the mass of the parent ion from which a particular daughter ion originated can be determined.

To summarize, from daughter ion flight time, parent ion mass can be determined by Equation (3). From the magnetic field strength required to produce a given degree of spatial dispersion as a result of ion path bending, taking also into account the ion velocity, the masses of all ions are determined by Equation (6).

Figure 3:
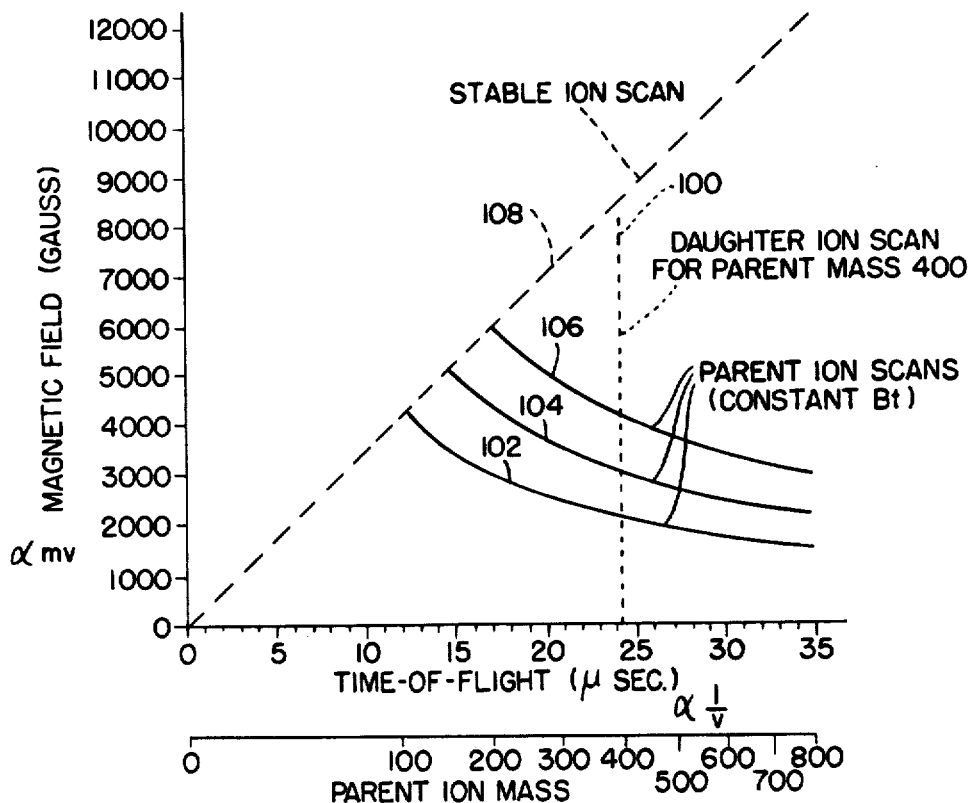
FIG. 3 is a plot depicting how magnetic field strength B and observed time-of-flight t are varied to achieve parent ion scans, daughter ion scans and stable ion scans in a time-resolved magnetic mass spectrometer.

With reference now to FIG. 3, the manner in which the system of the present invention is utilized to obtain the spectra previously available with tandem (MS/MS) instrumentation is graphically illustrated. In particular, FIG. 3 plots the relationship between magnetic field strength B and time-of-flight t for various types of scans, the scans being designated in accordance with the names previously developed in the context of tandem (MS/MS) mass spectrometry. FIG. 3 applies to the case of a time-resolved magnetic sector instrument with constant-energy acceleration.

In the time-resolved magnetic mass spectrometer 30 of FIG. 2, the various types of scans depicted in FIG. 3 are obtained by suitably measuring and/or controlling the field strength B within the magnetic sector and the point in time corresponding to a particular time-of-flight t at which the detector responds to ions under control of the digital computer 70. Both of these quantities, B and t, are varied during operation as a function of time to produce various scans. A specific instrument configuration which is suitable comprises a scanning magnetic sector followed by a single fixed-geometry ion detector connected to a time-slice detector or to an integrating time slice detector in which the time delay from the source pulse to the sampling window can be scanned. It will be appreciated that this is a relatively low cost and readily-implementable embodiment, and which provides data of significant usefulness.

Preliminarily, in FIG. 3 it may be noted that the horizontal axis is labeled with both time-of-flight and parent ion mass, indicating the relationship between these two in accordance with conventional time-of-flight principles, combined with the aspect of the present invention wherein daughter ion velocity is employed to determine parent ion mass. The relationship indicated is that of Equation (3), where mass is proportional to flight time squared.

In FIG. 3, the dotted line 100 represents a daughter ion scan, the line 100 indicating the time at which all daughter ions arrive at the detector from a parent ion of representative mass 400. Specifically, for a daughter ion scan (Constant Parent) the parent ion of interest is defined by observing or recording ions which arrive at the ion detector with the particular flight time t from Equation (3). Magnetic field strength B is varied as a function of time, and daughter ion mass is determined from B and t using Equation (6).

For parent ion scans, representative curves 102, 104 and 106 depict the manner in which B and t are both varied as a function of time in a linked scan in which their product is kept constant. Specifically, curves 102, 104 and 106 are plots of Equation (6) for three exemplary mass values. With such a scan, each daughter ion, regardless of its parent, is uniquely defined from Equation (6) by the product Bt. In FIG. 3, the curves 102, 104 and 106 respectively are curves for daughter ions of mass 100, 144 and 196, respectively. Moving along any one of the curves 102, 104 or 106 changes the flight time t, so that such daughters must derive from parents of different mass. Thus, measuring ion intensities along a single constant-daughter curve 102, 104 or 106 yields a parent ion scan.

A stable ion scan, achievable in instruments of the present invention, is a variation of a parent ion scan. The manner in which magnetic field strength B and time-of-flight t are both varied as a function of time for a stable ion scan are indicated by the dash line 108. For a stable ion scan, it is recognized that the mass of an ion which does not fragment after leaving the source, i.e., a stable ion, should be the same whether calculated from Equation (3) above or from Equation (6) above, provided the ion kinetic energy is known reasonably well. Thus, Equations (3) and (6) can be combined to give the following equation, which indicates the flight time, $t_s$, at which stable ions can be observed for a given value of the magnetic field B:

$$t_2 = Brl/2V \qquad (7)$$

where $t_s$ is the time-of-flight for stable ions for a given value of magnetic field B.

For a stable ion scan as indicated by the line 108, the magnetic field is scanned or varied as a function of time, and observation is limited to the time function, $t_s$, specified in Equation (7). Thus, stable ions can be determined, while screening out any ions which result from fragmentation processes. Such a scan beneficially gives a conventional mass spectrum free of "metastable peaks". It may also be noted that the parent ion scan curves 102, 104 and 106 terminate on the line 108, at which point daughter ion mass equals parent ion mass.

Conversely, by observing all ions for which the times-of-flight are longer than $t_s$ while scanning magnetic field strength B, a spectrum of daughter ions without any stable ions can be obtained. The results of such a scan may be termed a "metastable spectrum" or "total daughter", and has potential use as a "fingerprint" of a compound.

At this point it may be noted that, in accordance with the invention, stable ion scans and "total daughter" ion scans are achieved in time-resolved magnetic-sector instruments employing constant-energy acceleration, and in time-resolved electric-sector instruments employing constant-momentum acceleration.

Figure 4:
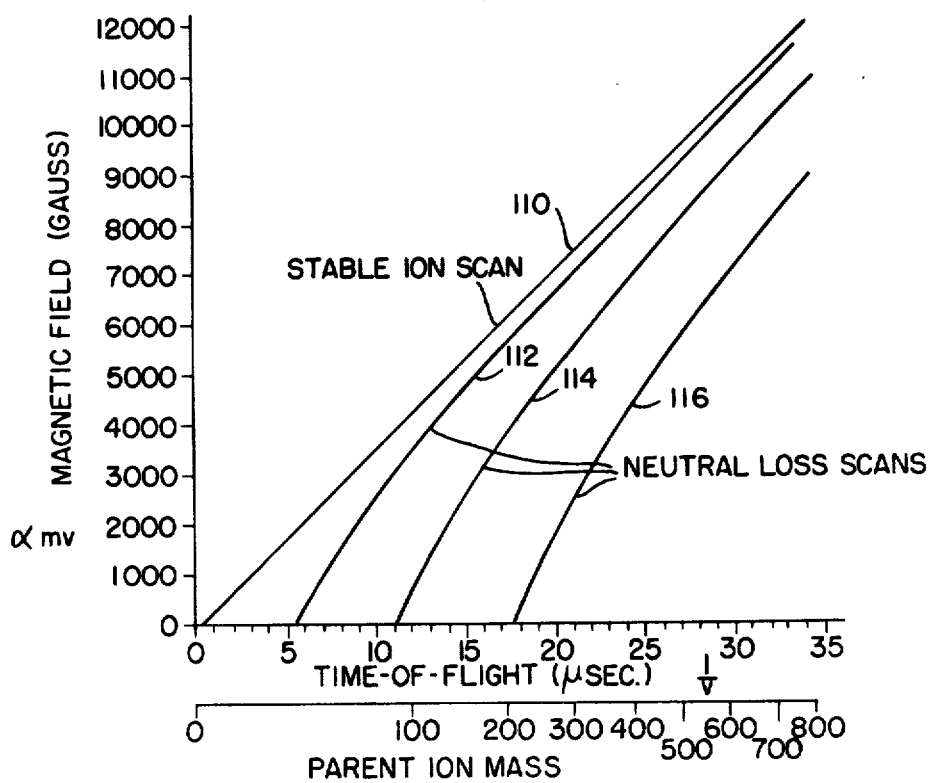
FIG. 4 is a plot similar to FIG. 3 depicting how B and t are varied to achieve neutral loss scans in a time-resolved magnetic mass spectrometer.

Another type of scan useful for the screening of mixtures is a neutral loss scan. FIG. 4 plots the manner in which magnetic field strength B and time-of-flight t are both varied as function of t in order to achieve a neutral loss scan. The equations plotted in FIG. 4 are derived next.

The neutral mass which is lost in a fragmentation process is defined by the following equation:

$$m_3 = m_1 - m_2 \qquad (8)$$

where
  $m_3$ is neutral mass lost,
  $m_1$ is parent ion mass, and
  $m_2$ is daughter ion mass.

Specifically, the linked scan of B and t to achieve a neutral loss scan is defined by the following equation, derived by subtracting Equation (6) from Equation (3):

$$m_3 = \frac{2Vet^2}{l^2} - \frac{Bret}{l} \qquad (9)$$

In FIG. 4, the lines 110, 112, 114 and 116 plot B versus t for four different values of $m_3$, neutral mass lost. Specifically, plotted are curves for $m_3 = 0$, 18, 79 and 200 mass units. Comparing FIGS. 3 and 4, it can be seen that the line 110 of FIG. 4 is identical to the line 108 of FIG. 3, indicating the scan for zero neutral mass lost is the same as a stable ion scan.

FIGS. 3 and 4 plot how B and t are varied to produce three types of scans. However, magnetic field strength B and ion flight time t are only two of the three parameters which can be experimentally varied in seeking different types of information. In the case of constant-energy acceleration, the third parameter which can be varied is accelerating voltage V. In the case of constant-momentum acceleration, the duration (T) or magnitude ($E_p$) of the accelerating pulse can be varied.

Specifically, examination of Equations (3) and (6) reveals the manner in which, for constant-energy acceleration, the accelerating voltage V can be scanned in combination with the time-of-flight t to achieve daughter ion scans and parent ion scans at a constant value of the magnetic field B.

To achieve a daughter ion scan, the parent ion mass must remain constant according to Equation (3). Thus the product of the accelerating voltage V and the square of the arrival time $t^2$ is kept constant while scanning these two parameters V and t such that different arrival times t cause different daughter ions to be selected at constant magnetic field B, according to Equation (6).

For a parent ion scan, the daughter ion mass must remain constant according to Equation (6). The arrival time t must therefore remain constant, at constant magnetic field, while scanning the accelerating voltage V in order to cause different parent ions to be selected according to Equation (3).

Advantageously, since magnetic field strength need not be scanned, a permanent magnet may be employed in the magnetic sector.

It should, however, be noted that, for a number of reasons, scanning magnetic field strength B or electrostatic deflection field strength E are generally preferred to scanning accelerating voltage V. Changes in the potentials on the extraction and focusing can defocus the ion source, resulting in some loss of sensitivity. Detector response also varies with energy, especially when a wide range of energies are used. For studies involving high-energy collision of ions with neutral atoms, changes in energy of the parent ions, if extreme, lead to different cross-sections for collision. Finally, a change in the accelerating voltage causes a change in resolution of the flight time measurements.

The discussion hereinabove with reference to FIGS. 3 and 4 has been primarily in the context of a time-resolved magnetic dispersion mass spectrometer. However, the principles of the invention are equally applicable to time-resolved electrostatic dispersion mass spectrometers. Specifically, as depicted in FIG. 2, the mass analyzer 44 may comprise either a magnetic sector including a magnetic deflection field (B field), or an electric sector including an electrostatic deflection field (E field). While the principles remain the same, the mathematical relationships are altered since a magnetic sector is a momentum dispersing device, and an electric sector is an ion kinetic energy dispersing device.

Specifically, an electric sector disperses ions by bending their paths in accordance with the following equation, which may be contrasted to Equation (5) hereinabove for a magnetic sector:

$$mv^2 = Ezer \qquad (12)$$

where E is the deflection electric field at radius r.

In normal use, an electric sector may be viewed as an energy filter and as such is conventionally employed in series with a magnetic sector in a double-focusing mass spectrometer for the purpose of improving resolution. Mass spectrometers comprising an electric sector alone are not generally available due to poorer mass resolution compared to single-sector magnetic instruments, and due to the fact that constant-momentum acceleration has not generally been employed outside the realm of TUF mass spectrometry. However, in some cases a time-resolved single electric sector instrument in accordance with the invention may be advantageous. As is demonstrated below, mass resolution is not a problem in the subject time-resolved instrument. Further, an electric sector can be easier to rapidly scan than a magnetic sector.

As in the case discussed above for a magnetic sector, ions are fragmented prior to entering the electric sector. In the fragmentation process, the ion kinetic energy changes (due to lesser mass of the daughter ions), but the ion velocity is essentially unchanged.

By replacing velocity v in Equation (12) with the expression for velocity v from Equation (2) (again assuming negligible difference between the ion velocity through the sector and the average ion velocity), ion mass in terms of electric sector field strength E and time-of-flight t is given by the following equation:

$$m/z = erEt^2/l^2 \qquad (13)$$

Thus Equation (13) for a time-resolved electrostatic dispersion mass (actually ion kinetic energy) spectrometer is analogous to Equation (6) for a time-resolved magnetic sector mass spectrometer. A time-resolved ion kinetic energy spectrometer in accordance with the invention determines daughter ion mass and the mass of any unfragmented (stable) parent ions by Equation (13). Parent ion mass is determined the same as in the case of the time-resolved magnetic sector mass spectrometer, i.e. from Equation (3) for constant-energy acceleration and from Equation (4) for constant-momentum acceleration. Significantly, equation (13) shows that, for a given mass, the product of E times $t^2$ is a constant. Thus the measurement of E and t for a detected ion allows a mass determination independent of ion momentum.

Figure 5:
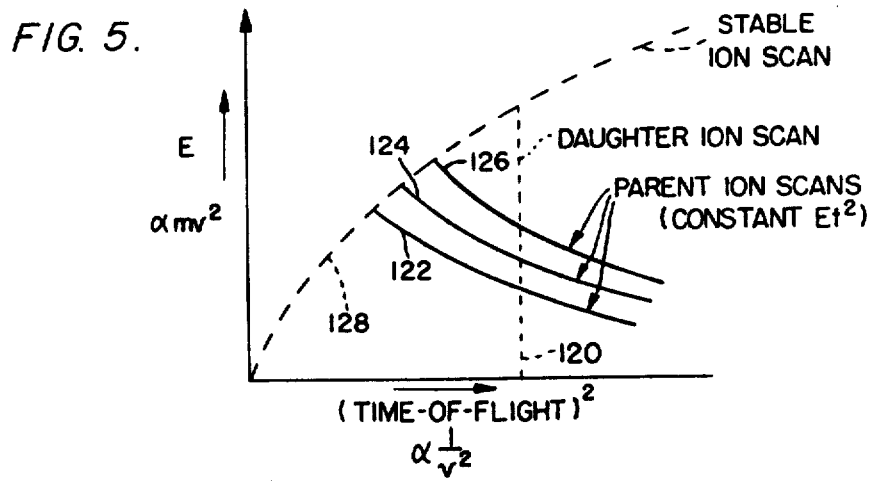
FIG. 5 is a plot depicting how electric field strength E and observed time-of-flight t are varied in order to achieve parent ion scans, daughter ion scans and stable ion scans in a time-resolved electric sector (ion kinetic energy) mass spectrometer.

The relationships between deflection electric field strength E and time-of-flight squared $t^2$ specified by Equation (13) for various types of scans in a time-resolved electric sector mass spectrometer employing constant-momentum acceleration are plotted in FIG. 5, which may be compared to the FIG. 3 relationships of magnetic field strength B and time-of-flight t in a time-resolved magnetic sector mass spectrometer employing constant-energy acceleration.

In FIG. 5, the line 120 for a daughter ion scan is vertical, as in the case of the daughter ion scan 100 of FIG. 3, since in both the magnetic and electric sector cases daughter ion time-of-flight t and thus velocity indicates parent ion mass.

In FIG. 5, lines 122, 124 and 126 indicate several representative parent ion scans, wherein a linked scan of electrostatic field strength E and time-of-flight t is done, keeping constant the product of E and $t^2$.

For a stable ion scan, as indicated by the FIG. 5 line 128, electric sector field strength E is scanned, while observation or recording of ions arriving at the ion detector is limited to the following time function, which is derived by setting the right sides of Equations (4) and (13) equal to each other:

$$t_{se} = E_p Tl/rE \qquad (14)$$

For a total daughter ion scan, observation or recording is limited to ions having flight times greater than $t_{se}$ defined by Equation (14).

To achieve a neutral loss scan in a time-resolved electric-sector instrument with constant-momentum acceleration, a linked scan of E and t is done (not depicted in FIG. 5) in accordance with the following equation derived by subtracting Equation (13) from Equation (4)

$$t_3 = \frac{E_p T e t}{l} - \frac{e r E t^2}{l^2} \quad (15)$$

Summary of Mass Assignment and Scanning Methods

Derived above and explained above in detail are equations for mass assignment and scanning methods for various selected cases in accordance with the invention. The following summary presents an overall analysis. This summary presents the time-resolved magnetic sector case first, for both constant-energy and constant-momentum acceleration, followed by the time-resolved electric sector case, also for both constant-energy and constant-momentum acceleration. Both constant energy ($\frac{1}{2} mv^2$) and constant momentum (mv) modes of acceleration can be utilized to provide ions having a constant relationship between mass (m) and velocity (v). Both deflection field strength (B or E) and ion acceleration (V or $E_p T$) scans are defined.

A. For a magnetic Sector.
  Daughter ion mass and sector-analyzed (stable) parent ion mass from Equation (6).
  1. For Constant-Energy Acceleration.
    Parent ion mass from Equation (3).
    a. Scanning B with fixed V.
      i. Daughter ion scan: Limit recording to time t from Equation (3). Daughter mass from B and t using Equation (6).
      ii. Parent ion scan: Linked scan of B and t with constant product from Equation (6). Parent mass from t and Equation (3).
      iii. Neutral loss scan: Linked scan of B and t using ((Equation (3)−(Equation (6)).
      iv. Stable ion scan: Scan B while limiting recording to time function $t_s$ from Equation (7).
      v. Total Daughter ion scan: Scan B, while limiting recording to flight times greater than $t_s$ from Equation (7).
    b. Scanning V with Fixed B.
      i. Daughter ion scan: Linked scan of V and t at constant $Vt^2$ from Equation (3). Daughter mass from t using Equation (6).
      ii. Parent ion scan: Limit recording to time t from Equation (6). Parent mass from t and V using Equation (3).
      iii. Neutral loss scan: Linked scan of V and t using: ((Equation (3)−(Equation (6)).
      iv. Stable ion scan. Scan V while limiting recording to $t_s$ from Equation (7).
      v. Total Daughter ion scan. Scan V while limiting recording to flight times greater than $t_s$ from Equation (7).
  2. For Constant-momentum acceleration.
    Parent ion mass from Equation (4).
    a. Scanning B with fixed $E_p T$.
      i. Daughter ion scan: limit recording to time t from Equation (4). Daughter ion mass from B and t using Equation (6).
      ii. Parent ion scan: Linked scan of B and t with constant product from Equation (6). Parent mass from t and Equation (4).
      iii. Neutral loss scan: Linked scan of B and t using (Equation (4))−(Equation (6)).
    b. Scanning $E_p T$ with fixed B.
      i. Daughter ion scan: Linked scan of $E_p T$ and t at constant $E_p T t$ using Equation (4). Daughter mass from t using Equation (6).
      ii. Parent ion scan: Limit recording to time t from Equation (6). Parent mass from t and $E_p T$ using Equation (4).
      iii. Neutral loss scan. Linked scan of $E_p T$ and t using (Equation (4))−(Equation (6)).

B. For an electric sector.
  Daughter ion mass and sector-analyzed (stable) parent ion mass from Equation (13).
  1. For constant-energy acceleration.
    Parent ion mass from Equation (3).
    a. Scanning E with fixed V.
      i. Daughter ion scan: Limit recording to time t from Equation (3). Daughter mass from E and t using Equation (13).
      ii. Parent ion scan: Linked scan of E and t at constant $Et^2$ from Equation (13). Parent mass from t and Equation (3).
      iii. Neutral loss can: Linked scan of E and t using (Equation (3))−(Equation (13)).
    b. Scanning V with fixed E.
      i. Daughter ion scan: Linked scan of V and t at constant $Vt^2$ using Equation (3). Daughter mass from t and Equation (13).
      ii. Parent ion scan: Limit recording to time t from Equation (13). Parent mass from t and V using Equation (3).
      iii. Neutral loss scan: Linked scan of V and t using (Equation (3))−(Equation (13)).
  2. For constant-momentum acceleration.
    Parent ion mass from Equation (4).
    a. Scanning E with fixed $E_p T$.
      i. Daughter ion scan: Limit recording to time t from Equation (4). Daughter ion mass from E and t using Equation (13).
      ii. Parent ion scan: Linked scan of E and t at constant $Et^2$ from Equation (13). Parent mass from t and Equation (4).
      iii. Neutral loss scan: Linked scan of E and t using (Equation (4))−(Equation (13)).
      iv. Stable ion scan: Scan E while limiting recording to time function $t_{se}$ from Equation (14).
      v. Total Daughter ion scan: Scan E while limiting recording to flight time greater than $t_{se}$ from Equation (14).
    b. Scanning $E_p T$ with fixed E.
      i. Daughter ion scan: Linked scan of $E_p T$ and t at constant $E_p T t$ from Equation (4). Daughter mass from t and Equation (13).
      ii. Parent ion scan: Scan $E_p T$ while limiting recording to time t from Equation (13). Parent mass from t and $E_p T$ using Equation (4).
      iii. Neutral loss scan: Linked scan of $E_p T$ and t using (Equation (4))−(Equation (13)).
      iv. Stable ion scan: Scan $E_p T$ while limiting recording to time function $t_{se}$ from Equation (14).

v. Total Daughter ion scan: Scan $E_pT$ while limiting recording to flight times greater than $t_{se}$.

Post Collection Data Processing

As mentioned above, a significant feature of the subject invention lies in the capacity for off-line data processing. For example, the three dimensional data field created by the time resolved magnetic sector mass spectrometer can be utilized in novel ways to improve the quantity and quality of the mass spectral information which is obtained.

When a constant energy source is used, daughter ions can be related to their parent ions by their velocity. However, there often is an increase in the spread of velocities dependent upon the fragmentation processes. For any ion, the specific coordinates of velocity and momentum (time and field strength) can be used to define ion mass independent of ion energy. Once the mass assignment has been made, the velocity coordinate for all ions of this mass can be examined. The daughter ions can be separated from the stable ions at this mass and, where the same daughter mass occurs from more than one parent, separated from each other. The single daughter ion velocity profile can then be examined, and by applying curve fitting methods, the probable velocity of the parent can be predicted with an accuracy beyond the observed resolution of the daughter ion packet. The data files can then be examined for the presence of candidate parents and logical schemes, including iterations where appropriate, can be utilized to establish, with high confidence, the parent-daughter relationship. By these processes the maximum accuracy of the assignment depends upon the resolution accuracy of the parent ion mass.

Similar processes can also be applied to the time-resolved electric sector mass spectrometer and other types of mass spectrometer instruments which produce a two-dimensional mass axis, one of which is velocity (flight time).

An interesting feature of the integrating transient recorder form of time array detection is that the data may be collected serially along the time axis at high resolution and all the data for each ion pulse can be stored. In addition to the types of processing described above, sensitivity/resolution trade-offs can be made by subsequent processing of the data employing a computer.

In summary, the multidimensional arrays created by application of this invention are readily amenable to extensive data processing. The attached computers are capable of this processing and can be applied in an automatic or interactive mode. The results can be graphic, tabular or both and new types of correlations can be extracted from the collected data.

Mass Resolution Consideration With the Subject Time-Resolved Mass Spectrometry Technique In the exemplary time-resolved, constant accelerating voltage, magnetic dispersion mass spectrometer embodiment of the invention, the factors affecting ion mass resolution are similar for both parent ions and daughter ions. This is because any ion mass is defined only by the product Bt and is virtually independent of any energy spread of the ions occuring before or very early in the flight time. Thus, for instance, the accelerating voltage V, absent from Equation (6), has no effect upon the value of Bt for ions of a specified mass. Similarly, accelerating voltage V is absent from Equation (13), and has no effect on the value of $Et^2$ for ions of specified mass in the electrostatic sector case. Any spread in the energies of the ions results in a spread in the possible values of B and t, but the product Bt remains unchanged.

The mass resolution can be evaluated by considering the contributions to the uncertainties in the Bt product by the experimentally-measurable quantities.

The accuracy in the magnetic field B measurement is determined by the field inhomogeneity, field stability, the effect of fringing fields, as well as the precision of the signal from the magnetic field sensor and the calibration procedure. Timing precision for time-of-flight is limited by the time duration of the packet-forming (bunching) pulse, the accuracy in measuring the delay time, and the aperture window of the sampling electronics. Precision in the radius r is determined by the slit width, and precision in the flight length l is determined by the "depth" of the ion volume sampled, by the range in path lengths through the magnetic sector due to first-order focusing in the sector and the "depth" of the ion detector.

Figure 6:
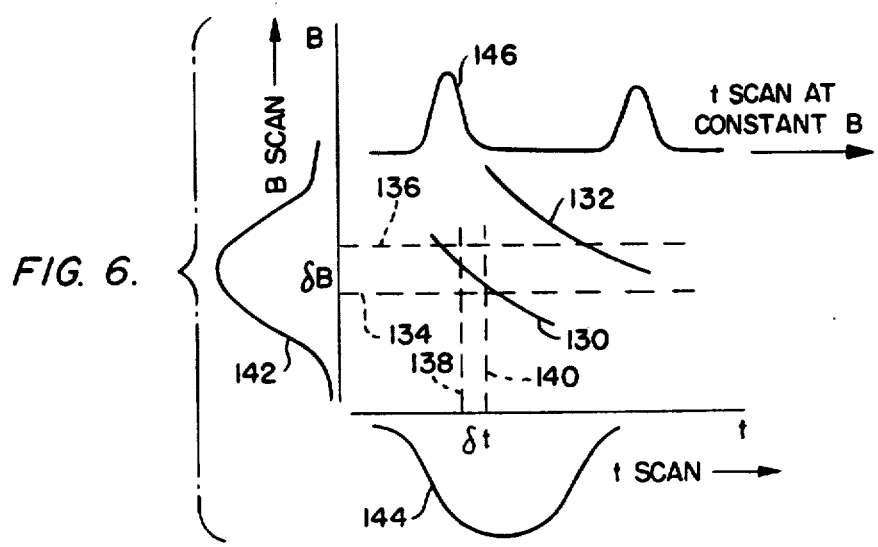
FIG. 6 is a plot on a hypothetical B-t plane depicting enhanced mass resolution in the subject time-resolved mass spectrometers.

FIG. 6 is an expanded portion of a hypothetical B-t plane for two stable ions of slightly different mass. The solid curves 130 and 132 represent the signals expected for these two masses. Uncertainties in B and t are indicated by dash lines 134, 136, 138 and 140. The "length" of each of the curves 130 and 132 represents the energy spread of the ions. Higher energy ions appear at shorter times-of-flight and larger field strengths. Similarly, lower energy ions appear at longer flight times and lower field strengths.

With reference to FIG. 6, resolution for simple magnetic, for simple time-of-flight, and for the subject time-resolved magnetic dispersion mass spectrometers can be compared. In a simple magnetic instrument with no time resolution, the ion intensity would be "squeezed" into the B axis as indicated by the broad peak 142. The right end of the higher mass peak 132 overlaps the left end of the lower mass peak 130 to give two unresolved peaks. Likewise, in a simple TOF instrument, the two peaks 130 and 132 overlap on the time axis as indicated by the broad peak 144, giving poor resolution.

In contrast, the time-resolved mass spectrometer of the subject invention looks at a two-dimensional section of the FIG. 6 plot, and as such is capable of a higher resolving power. As indicated by the curve 146, the masses represented by the two curves 130 and 132 are completely resolved if the region delineated by B and t contains no ion intensity. Resolution becomes limited at high masses when the separation of Bt curves for nearby masses is less than the uncertainty in the Bt product.

The energy spread of the stable ions is due to the initial energy spread in the ions before extraction as well as slight variations in extraction voltage "seen" by the ions since they originate at different points in the source. Significantly, the energy spread is manifested as a spread of ion intensity along a curve of constant Bt, but does not affect the value of Bt nor does it affect the resolution of an ion mass assignment. Small energy changes from fragmentation can cause the ion velocity in the dispersing sector to differ slightly from the measured average flight velocity. Thus mass resolution for daughter ions may be slightly poorer than for parent ions. However, this decrease in resolution can be negligibly small if the fragmentation occurs early in the flight path.

Thus resolution in two dimensions (magnetic field strength for a fixed angular dispersion, and time-of-flight) removes the effect of energy spread on mass determination and is quite advantageous. "Energy focusing", normally required in time-of-flight analysis to improve the resolution is not required. "Space focusing" with a conventional TOF source can be optimized without the need to worry about the mutual incompatibility of the two focusing techniques. For normal MS applications, the magnet can act as a filter for TOF analysis. Indeed, magnets have been used previously in TOF-MS to filter out ions with large energy deviations, such as those produced in laser desorption (Bykovskii, Yu. A. et al, *Sov. Phys.-Tech. Phys.*, 1969, 13, pp. 986–988 (English translation); *Zh. Tekh. Fiz.* 1968, 38, pp. 1194–1196; Kovalev, N. D. et al, *Sov. Phys.-Tech. Phys.*, 1978, 23, pp. 718–720 (English translation); *Zh. Tekh. Fiz.* 1978, 48, pp. 1282–1285.). Magnets have also been proposed for focusing ions with equal momentum acceleration (Poschenrieder, W. P. *Int. J. Mass Spectrom. Ion Phys.*, 1971, 6, pp. 413–426). Thus, magnetic dispersion provides an alternative to other methods of dealing with energy spreads, such as the recently introduced "Mamyrin reflectron". (Mamyrin, B. A. et al, *Sov. Phys. JETP*, 1973, 37, p. 45 (Engl. Transl.); *Zh. Eksp. Teor. Fiz.*, 1973, 64, pp. 82–89.

Spatial Array Detectors

Up to this point, specific apparatus in accordance with the invention has been described in the context of single fixed geometry ion detectors wherein ion groups of differing mass are successively swept through a single sector exit slit by varying magnetic or electrostatic field stength (or accelerating voltage) as a function of time. The detector includes an electron multiplier to provide a usable output current as individual ions pass through the exit slit. Described next with reference to FIG. 7 is an embodiment of the invention including a spatial array detector.

Figure 7:
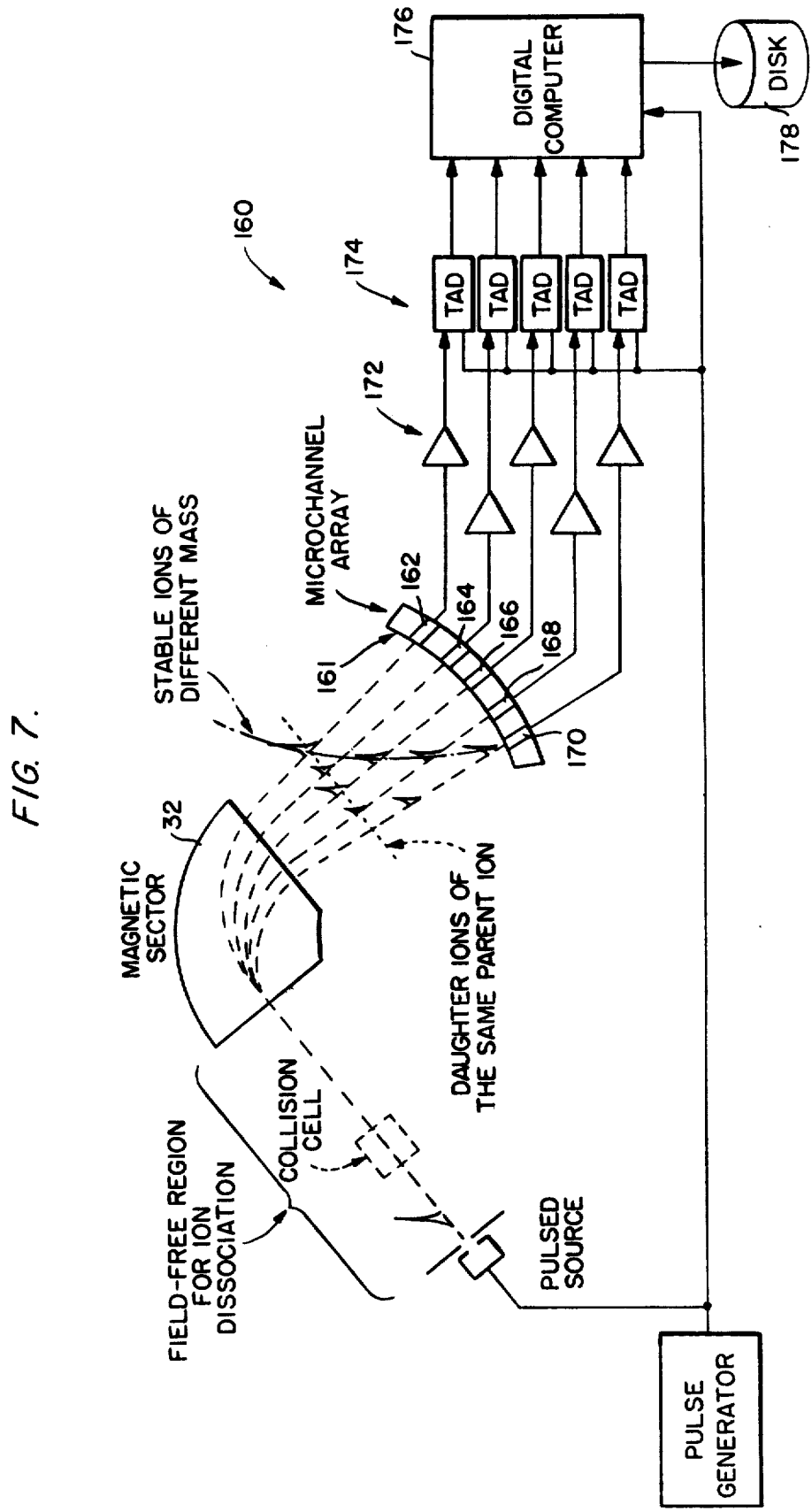
FIG. 7 depicts a modification of the FIG. 2 time-resolved mass spectrometer employing a microchannel spatial array detector.

Referring in detail to FIG. 7, the mass spectrometer 30 of FIG. 2 is modified by providing a detector system, generally designated 160, based on a multichannel spatial array detector at the output of the magnetic sector 32. In FIG. 7, unlike FIG. 2, magnetic field strength within the magnetic sector 32 is not scanned during operation. Rather, a microchannel array 161, positioned at the focal plane of the magnetic sector 32, simultaneously detects and individually resolves ion currents from a plurality of ion paths by means of individual microchannels represented at 162, 164, 166, 168 and 170. The microchannel array 161 may comprise either a microchannel electron multiplier array, or a microchannel electro-optical detector (EIOD) of the type described in Giffen Pat. Ser. No. 3,955,084. For other suitable examples, reference may be had to the following four literature references: H. G. Boettger, C. E. Giffin, D. D. Norris, in *Multichannel Image Detectors*, Y. Talmi, ed., ACS Symposium Series - 102, Washington, D.C., American Chemical Society, 1979, pp. 291–318; C. E. Giffen, H. G. Boettger, D. D. Norris; *Int. J. Mass Spectrom. Ion Phys.*, 15, 437–449 (1974); J. H. Beynon, D. O. Jones, R. G. Cooks, *Anal. Chem.*, 47, 1734–1738 (1975); and H. H. Tuithof, A. J. H. Boerboom, H. L. C. Meuzelaar, *Int. J. Mass Spectrom. Ion Phys.*, 17, 299–307 (1975).

The individual outputs of the microchannel array 161 are connected through suitable buffer amplifiers or converters 172 to individual time array detectors (TAD) 174, connected to a digital computer 176, in turn connected to a high-capacity storage unit such as a disk 178. The overall detector system 160 then serves, as in the previous embodiments, to determine deflection field strength required to produce a particular angular dispersion, and to determine ion time of flight and thus velocity.

FIG. 7 thus represents an advanced form of time-resolved magnetic mass spectrometer wherein complete MS/MS data are obtained for every pulse from the source.

Multiple-Sector Instruments

Described hereinabove with reference to FIGS. 2 and 7 are single-sector time-resolved mass spectrometers in accordance with the invention. Time-resolution in accordance with the invention can also be combined with double-focusing or other multiple-sector mass spectrometers.

Figure 8:
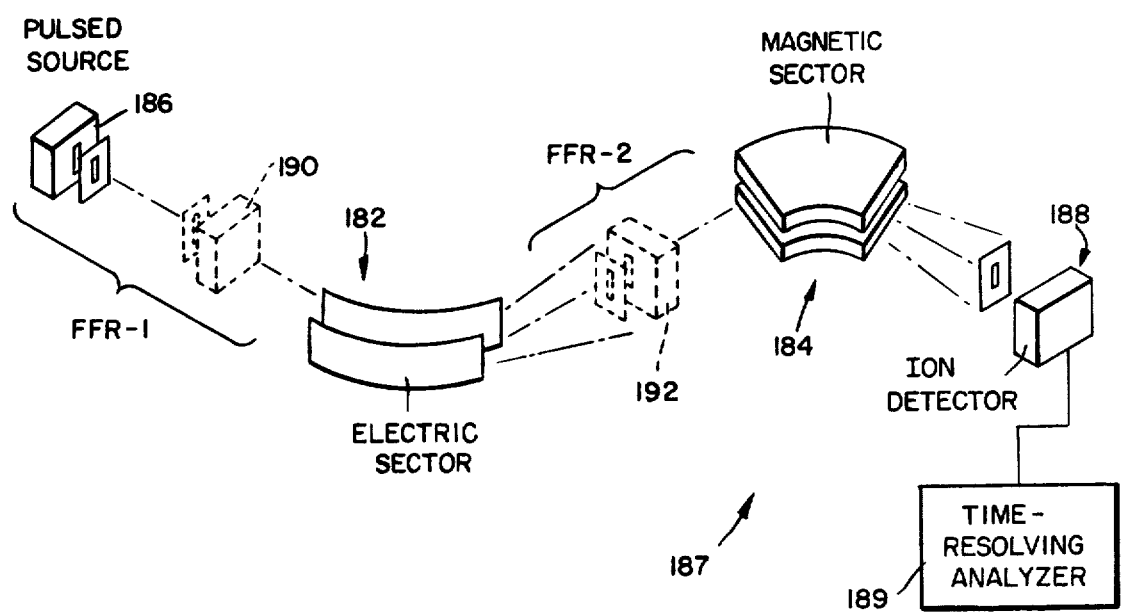
FIG. 8 is a block diagram of a time-resolved multiple-sector mass spectrometer in accordance with the invention.

Referring to FIG. 8, a double-focusing mass spectometer 180 of normal geometry, that is, including an electric sector 182 followed by a magnetic sector 184, is combined with a pulsed ion source 186 and a detector system 187 including an ion detector 188 and a time-resolving analyzer 189 in accordance with the present invention. The double-focusing mass spectrometer 180 has two field-free regions, FFR-1 and FFR-2. The first free region FFR-1 is between the pulsed source 186 and the first sector 182, and the second field-free region FFR-2 is between the first sector 182 and the second sector 184.

Either or both of the field-free regions FFR-1 and FFR-2 may be employed as fragmentation regions, and optionally may include collision cells represented at 190 and 192 for collisionally-activated dissociation.

In general, the time-resolved double-focusing mass spectrometer 180 of FIG. 8 operates as described above with reference to FIG. 2. However, an additional level of information is available as will now be described.

Specifically, as a result of fragmentation in the second field-free region, FFR-2, the instrument 180 achieves time-resolved magnetic sector mass spectrometry with energy filtered ions (parent ions) from the pulsed source 186. The result of fragmentation in the first field free region, FFR-1, can be viewed either as time-resolved magnetic sector mass spectrometry with energy-filtered daughter ions, or time-resolved electric sector mass spectrometry with momentum-filtered daughter ions. With fragmentation in both field-free regions, FFR-1 and FF-2, daughters formed in FFR-1 can be fragmented in FFR-2 to form granddaughter ions. Significantly, both daughters and granddaughters retain the velocity of the grandparent, and measurement of granddaughter velocity through time-of-flight techniques as described above yields the grandparent ion mass. Thus, an additional level of information is available.

Specifically depicted in FIG. 8 is a modified normal geometry double-focusing mass spectrometer. Reversed-geometry double-focusing mass spectrometers are also available, wherein the positions of the magnetic sector 184 and the electric sector 182 are reversed so that the magnetic sector precedes the electric sector in the ion path. In such event, the results are analogous to that described above with reference to normal-geometry double-focusing mass spectrometers. For the case of the second field-free region, FFR-2, the results obtained are time-resolved electric sector mass spectrometry with momentum filtering of the parent ions. For the case of fragmentation occurring in the first field-free region, FFR-1, the results are the same as in the case of the normal geometry instrument since the order of filters is immaterial. In the case of fragmentations occurring in both field-free regions, FFR-1 and FFR-2, what is obtained is time-resolved electric sector mass analysis of granddaughters as well as the previously-described analysis of daughters and parents. In all cases, the time-of-flight of the granddaughter ions ultimately reaching the detector indicates the velocity of the intermediate daughter ions, as well as the velocity of the grandparent ions, and thus indicates the mass of the grandparent ions.

While the instrument 180 of FIG. 8 employs an electric sector and a magnetic sector, it will be appreciated that similar instruments can be constructed with two magnetic sectors, two electric sectors, or more than two sectors of either type.

Time Array Detectors

It will be appreciated that, given the concepts of the present invention, the use of suitable time array detector is an important aspect of practical implementations, particularly with single-slit detectors where the magnetic field B is scanned as in FIG. 2.

As mentioned hereinabove, various forms of time-slice detectors (TSD) and time array detectors (TAD) are known, many of which are suitable in the practice of the present invention.

For example, Lincoln has constructed a detector system which captures a substantial fraction of the information from a single ion source pulse from a time-of-flight instrument employing a digital transient recorder connected to a signal averager. Subsequent transfer from the transient memory requires approximately three milliseconds. While this sequence of events enables only 330 ion source pulses scans to be analyzed each second, significant increases in dynamic range and sensitivity were reported over the time-slice detection mode. See K. A. Lincoln, NASA Report Tm-81224; and K. A. Lincoln, *Dyn. Mass Spectrom.*, 6, 111-119 (1981).

In order to maximize the utility of the information available in a time-resolved mass spectrometer, particularly when employed with chromatographic apparatus to obtain MS/MS-type data during a single chromatographic peak, it is necessary to collect, store and process in real time all the ion currents striking the single detector. This involves data collection rates in the order of 50 to 100 MHz, and data storage and summation with the fastest logic available, for example, emitter coupled logic (ECL).

In one form, the detector combines an electron multiplier with an intelligent integrating transient recorder (ITR). The ITR-based detector system is somewhat analogous to the electro-optical spatial array detector (EOID) in which the ions of a complete spectrum are measured simultaneously, and then shifted out of the detector array sequentially. The EOID detector has a number of disadvantages which include a physically-limited mass range, and a non-linear mass coordinate across this range. It is also extremely complex mechanically, electrically, and optically.

On the other hand, TAD has the advantages of higher gain, simple mechanical construction, and ease of non-linear mass range correction.

In general, use of the integrating transient recorder enables the sequential detection, storage and integration of the intensities from all the ions of a predetermined plurality of time scans each corresponding to a single ion extration pulse. The time-resolved (equivalent to mass-resolved) ion currents acquired from the predetermined plurality of time scans are integrated in individual time-resolved channels or "time bins". A predetermined number of ion pulses and thus time scans are generated for each increment of resolution of magnetic field strength. Thus, following a single scan of magnetic field strength, complete MS/MS data are available. The process is sufficiently fast for completion during a single chromatographic peak.

As mentioned above under the heading "Summary of the Invention", an advanced form of integrating transient recorder operating at the required data rate is disclosed in commonly-assigned U.S. patent application Ser. No. 385,115, filed June 1, 1982, concurrently herewith, by Christie George ENKE, Bruce Hewitt NEWCOME and John Francis HOLLAND and entitled: "HIGH REPETITION RATE TRANSIENT RECORDER WITH AUTOMATIC INTEGRATION", the entire disclosure of which is hereby expressly incorporated by reference. In order to ensure that the entire disclosure of the above-incorporated, concurrently-filed U.S. application Ser. No. 385,115 is available to the public upon the issuance of the patent on the subject application, a complete copy of U.S. application Ser. No. 385,115 will be made of record in the subject patent application file, and the Commissioner of Patents and Trademarks will be authorized and requested to grant access to the file of U.S. application Ser. No. 385,115 upon the issuance of the subject patent application, regardless of whether a patent on U.S. application Ser. No. 385,115 has at that time yet issued.

Conclusion

It will be apparent, therefore, that the present invention provides apparatus and methods for obtaining MS/MS-type data which increases data throughput by several orders of magnitude, extends the mass range beyond that provided by triple quadrupole MS/MS, and improves the mass resolution for daughter ions beyond that provided by MIKES MS/MS. The subject instruments are sufficiently fast to enable GC-MS/MS or LC-MS/MS, with extensive data collection during each chromatographic peak. Further, simple single-focusing magnetic sector mass spectrometers can be readily retrofitted to practice the present invention through the addition of a pulsed ion source and a time-resolved detection system.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A time-resolved mass dispersive mass spectrometer comprising:
   a source for providing sample ions;
   an accelerator means for accelerating the sample ions to provide ions having a substantially constant relationship between mass and velocity;
   a drift region for time separation included in said mass spectrometer, and an ion bunching device upstream of at least the drift region;

a mass analyzer following at least said ion accelerator including a deflection field for angularly dispersing sample ions; and a detector system responsive to ion intensity and the deflection field strength required to produced a particular angular dispersion, and coupled to said bunching device for determining ion flight time.

2. A mass spectrometer in accordance with claim 1, which further comprises an output computation device for determining ion mass based on the deflection field strength and ion flight time.

3. A mass spectrometer in accordance with claim 2, which further comprises a computer control system for controlling scanning of the deflection field strength.

4. A mass spectrometer in accordance with claim 1, wherein said mass analyzer includes a magnetic field for angularly dispersing ions.

5. A mass spectrometer in accordance with claim 4, wherein determined magnetic field strength establishes ion momentum and said output computation device establishes ion mass independent of ion kinetic energy.

6. A mass spectrometer in accordance with claim 4, operable to establish a three-dimensional data field for subsequent analysis, the three-dimensional data field including ion intensity data as a function of ion flight time and deflection magnetic field strength.

7. A mass spectrometer in accordance with claim 4, which further comprises:
an entrance aperture for said detector system such that only ions of substantially a predetermined angular dispersion enter said detector system;
control elements for varying in time the magnetic field strength within said magnetic mass analyzer to provide a magnetic scan; and
control elements for repetitively pulsing said ion bunching device during each magnetic scan.

8. A mass spectrometer in accordance with claim 1, wherein said mass analyzer includes an electric field for angularly dispersing ions.

9. A mass spectrometer in accordance with claim 8, wherein determined electric field strength establishes ion kinetic energy and said output computation device establishes ion mass independent of ion momentum.

10. A mass spectrometer in accordance with claim 8, operable to establish a three-dimensional data field for subsequent analysis, the three-dimensional data field including ion intensity data as a function of ion flight time and deflection electric field strength.

11. A mass spectrometer in accordance with claim 8, which further comprises:
an entrance aperture for said detector system such that only ions of substantially a predetermined angular dispersion enter said detector;
control elements for varying in time the electric field strength within said electrostatic mass analyzer to provide an electric field scan; and
control elements for repetitively pulsing said ion bunching device during each deflection electric field scan.

12. A time-resolved mass dispersive spectrometer comprising:
a source for providing parent ions;
a accelerator for accelerating the parent ions;
a fragmentation region wherein at least some accelerated parent ions may fragment to produce daughter ions;

a drift region for time separation included in said mass spectrometer, and an ion bunching device upstream of at least the drift region;

a mass analyzer following said fragmentation region including a deflection field for angularly dispersing the daughter ions and any unfragmented parent ions as a function of deflection field strength; and a detector system responsive to ion intensity and the deflection field strength required to produce a particular angular dispersion and coupled to said bunching device for determining ion time-of-flight and thus velocity as an indicator of parent mass of a detected daughter ion, and as an indicator, in combination with determined deflection field strength, of parent and daughter ion mass.

13. A mass spectrometer in accordance with claim 12, wherein said mass analyzer includes a magnetic field for angularly dispersing ions.

14. A mass spectrometer in accordance with claim 12, wherein said mass analyzer includes an electric field for angularly dispersing ions.

15. A mass spectrometer in accordance with claim 12, wherein said ion bunching device comprises an ion source for providing parent ions in pulses separated in time.

16. A mass spectrometer in accordance with claim 13, which further comprises:
an entrance aperture for said detector system such that only ions of substantially a predetermined angular dispersion enter said detector system;
control elements for varying in time the magnetic field strength within said magnetic mass analyzer to provide a magnetic scan; and
control elements for repetitively pulsing said ion bunching device during each magnetic scan.

17. A mass spectrometer in accordance with claim 16, wherein said detector system includes a transient recorder for recording ions arriving at a plurality of individual times for each of a plurality of individual values of magnetic field strength.

18. A mass spectrometer in accordance with claim 13, wherein said detector system includes a microchannel array ion detector for recording ions arriving with a plurality of angular dispersions for a particular value of magnetic field strength.

19. A mass spectrometer in accordance with claim 18, wherein said detector system comprises microchannel transient recorders for recording ions arriving at a plurality of individual times for each of a plurality of individual values of angular dispersion for each pulse of said ion bunching device.

20. A mass spectrometer in accordance with claim 13, operable to establish a three-dimensional data field for subsequent analysis, the three-dimensional data field including ion intensity data as a function of ion flight time and deflection magnetic field strength.

21. A mass spectrometer in accordance with claim 14, which further comprises:
an entrance aperture for said detector system such that only ions of substantially a predetermined angular dispersion enter said detector system:
control elements for varying in time the electric field strength within said electrostatic mass analyzer to provide an electric field scan; and
control elements for repetitively pulsing said ion bunching device during each deflection electric field scan.

22. A mass spectrometer in accordance with claim 21, wherein said detector system includes a transient recorder for recording ions arriving at a plurality of individual times for each of a plurality of individual values of electric field strength.

23. A mass spectrometer in accordance with claim 14, wherein said detector system includes a microchannel array ion detector for simultaneously recording ions arriving with a plurality of angular dispersions for a particular value of deflection electric field strength.

24. A mass spectrometer in accordance with claim 23, wherein said microchannel array comprises microchannel transient recorders for recording ions arriving at a plurality of individual times for each of a plurality of individual values of angular dispersion for each pulse of said ion bunching device.

25. A mass spectrometer in accordance with claim 14, operable to establish a three-dimensional data field for subsequent analysis, the three-dimensional data field including ion intensity data as a function of ion flight time and deflection electric field strength.

26. A mass spectrometer in accordance with claim 12, wherein said fragmentation region comprises a drift region space facilitating metastable decomposition.

27. A mass spectrometer in accordance with claim 12, wherein said fragmentation region comprises a collision chamber.

28. A mass spectrometer in accordance with claim 13, wherein said fragmentation region comprises a drift region space facilitating metastable decomposition.

29. A mass spectrometer in accordance with claim 13, wherein said fragmentation region comprises a collision chamber.

30. A mass spectrometer in accordance with claim 14, wherein said fragmentation region comprises a drift region space facilitating metastable decomposition.

31. A mass spectrometer in accordance with claim 14, wherein said fragmentation region comprises a collision chamber.

32. A combined chromatography and time-resolved mass dispersive mass spectrometry system comprising:
 a chromatographic column for providing components of a sample as a function of time;
 a source coupled to the output of said chromatographic column for ionizing the sample components to provide parent ions;
 an accelerator for accelerating the parent ions;
 a drift region for time separation included in said mass spectrometer, and an ion bunching device upstream of at least the drift region;
 a mass analyzer following at least said ion accelerator including a deflection field for angularly dispersing sample ions; and
 a detector system responsive to ion intensity and the deflection field strength required to produce a particular angular dispersion, and coupled to said bunching device for determining ion flight time.

33. A combined chromatography and time-resolved mass dispersive mass spectrometry system comprising:
 a chromatographic column for providing components of a sample as a function of time;
 a source coupled to the output of said chromatographic column for ionizing the sample components to provide parent ions;
 an accelerator for accelerating the parent ions;
 a fragmentation region wherein at least some accelerated parent ions may fragment to produce daughter ions;
 a drift region for time separation included in said mass spectrometer, and an ion bunching device upstream of at least the drift region;
 a mass analyzer following said fragmentation region including a deflection field for angularly dispersing the daughter ions and any unfragmented parent ions as a function of ion mass and velocity and of deflection field strength; and
 a detector system responsive to ion intensity and the deflection field strength required to produce a particular angular dispersion, and coupled to said bunching device for determining ion time-of-flight and thus velocity as an indicator of parent mass of a detected daughter ion, and as an indicator, in combination with determined deflection field strength, of parent and daughter ion mass.

34. A combined chromatography and mass spectrometry system in accordance with claim 33, wherein said chromatographic column comprises a gas chromatographic column.

35. A combined chromatography and mass spectrometry system in accordance with claim 33, wherein said chromatographic column comprises a liquid chromatographic column.

36. A combined chromatography and mass spectrometry system in accordance with claim 33, wherein said mass analyzer includes a magnetic field for angularly dispersing ions.

37. A combined chromatography and mass spectrometry system in accordance with claim 33, wherein said mass analyzer includes a deflection electric field for angularly dispersing ions.

38. A retrofit kit for converting a magnetic sector mass spectrometer of the general type including an ion source for providing sample ions, and ion accelerator for accelerating the sample ions, a magnetic mass analyzer including a magnetic deflection field for angularly dispersing sample ions as a function of momentum and as a function of magnetic deflection field strength, an ion detector responsive to the ion intensity output of the magnetic sector, and an aperture such that only ions of predetermined angular dispersion enter the detector to a time-resolved mass dispersive mass spectrometer, said retrofit kit comprising:
 an ion bunching device for bunching ions prior to their entering a drift region in the spectrometer extending downstream of the ion bunching device; and
 a detector system responsive to ion intensity and the deflection magnetic field strength required to produce a particular angular dispersion and coupled to said bunching device for determining ion flight time.

39. A time-resolved multi-sector mass dispersive mass spectrometer comprising:
 a source for providing sample ions
 an accelerator for accelerating the sample ions;
 a drift region for time separation included in said mass spectrometer, and an ion bunching device upstream of at least the drift region;
 first and second mass analyzers in tandem following at least said ion accelerator, each of said mass analyzers including a deflection field for angularly dispersing ions;
 an aperture between said mass analyzers such that only ions exiting said first mass analyzer with substantially a predetermined angular dispersion enter said second mass analyzer; and a detector system responsive to ion intensity and the deflection field strength required to produce a particular angular dispersion, and coupled to said bunching device for determining flight time.

40. A mass spectrometer in accordance with claim 39, wherein said first mass analyzer comprises an electric sector and said second mass analyzer comprises a magnetic sector.

41. A mass spectrometer in accordance with claim 39, wherein said first mass analyzer comprises a magnetic sector and said second mass analyzer comprises an electric sector.

42. A mass spectrometer in accordance with claim 39, which comprises a fragmentation region prior to said first mass analyzer.

43. A mass spectrometer in accordance with claim 39, which comprises a fragmentation region between said first and second mass analyzers.

44. A mass spectrometer in accordance with claim 39, which comprises a first fragmentation region prior to said first mass analyzer and a second fragmentation region between said first and second mass analyzers.

45. A mass spectrometry method for determining relationships between selected parent ions and daughter ions produced by fragmentation, said method comprising the steps of:
ionizing a quantity of sample to produce parent ions;
accelerating the parent ions;
facilitating fragmentation of at least some accelerated parent ions to produce daughter ions without substantial change in velocity;
directing the daughter ions and any unfragmented parent ions through a deflection field for angularly dispersing ions;
bunching the ions and allowing ions, at any point subsequent to bunching, to separate along a path of travel, through a drift region in the spectrometer extending downstream of the ion bunching, and effectively separate in time; and
detecting ions subsequent to passage through the deflection field and subsequent to separation in time, for determining deflection field strength required to produce a particular angular dispersion, and determining ion time-of-flight through said drift region, and thus velocity as an indicator of parent mass of a detected daughter ion, and as an indicator, in combination with determined deflection field strength, of parent and daughter ion mass.

46. A mass spectrometry method in accordance with claim 45, wherein said step of directing ions through a deflection field comprises directing the daughter ions and any unfragmented parent ions through a magnetic field.

47. A mass spectrometry method in accordance with claim 45, wherein said step of directing ions through a deflection field comprises directing the daughter ions and any unfragmented parent ions through an electric field.

48. A mass spectrometry method in accordance with claim 45, wherein said step of bunching the ions comprises pulsing an ion source wherein the parent ions are produced.

49. A mass spectrometry method in accordance with claim 46, which further comprises:
allowing only ions of substantially a predetermined angular dispersion to be detected;
varying the magnetic field strength in time to provide a magnetic scan; and
repetitively pulsing said ion bunching device during each magnetic scan, each pulse corresponding to a particular value of magnetic field strength, such that any ions reaching said detector following a particular pulse have a particular momentum.

50. A mass spectrometry method in accordance with claim 47, which further comprises:
allowing only ions of predetermined angular dispersion to be detected;
varying the deflection electric field strength as a function of time to provide a deflection electric scan; and
repetitively pulsing said ion bunching device during each deflection electric field scan, each pulse corresponding to a particular value of deflection electric field strength, such that any ions reaching said detector following a particular pulse have a particular kinetic energy.

51. A mass spectrometer in accordance with claim 1, wherein such accelerator means provides sample ions having substantially equal kinetic energy.

52. A mass spectrometer in accordance with claim 1, wherein said accelerator means provides sample ions having substantially equal momentum.

* * * * *